US006845707B1

United States Patent
Xu et al.

(10) Patent No.: US 6,845,707 B1
(45) Date of Patent: Jan. 25, 2005

(54) AUTOMATIC FRYING APPARATUS FOR BOTH DEEP AND SHALLOW FRYING

(76) Inventors: Zhaoxia Xu, 4694 Sycamore Dr., Ypsilanti, MI (US) 48197; Zheng Peng, 4694 Sycamore Dr., Ypsilanti, MI (US) 48197

(*) Notice: Subject to any disclaimer, the term of this patent is extended or adjusted under 35 U.S.C. 154(b) by 0 days.

(21) Appl. No.: 10/604,389

(22) Filed: Jul. 17, 2003

(51) Int. Cl.[7] .......................... A47J 37/00; A47J 27/00; A47J 37/12
(52) U.S. Cl. ............................ 99/348; 99/409; 99/476; 99/339
(58) Field of Search .......................... 99/409, 403, 407, 99/348, 339, 340, 467, 473, 474, 475, 476

(56) References Cited

U.S. PATENT DOCUMENTS

| | | | |
|---|---|---|---|
| 4,649,810 A | * | 3/1987 | Wong ........................... 99/326 |
| 5,027,697 A | | 7/1991 | De Longhi |
| 5,543,166 A | | 8/1996 | Masel |
| 5,549,042 A | * | 8/1996 | Bukoschek et al. ........... 99/455 |
| 5,611,265 A | | 3/1997 | Ronci |
| 6,054,681 A | * | 4/2000 | Siu ............................. 219/385 |
| 6,077,555 A | * | 6/2000 | Dotan ......................... 426/438 |
| 6,365,878 B1 | | 4/2002 | Lau |
| 6,453,801 B1 | | 9/2002 | Masel |
| 6,505,545 B2 | * | 1/2003 | Kennedy et al. ............... 99/331 |
| 6,615,708 B1 | * | 9/2003 | Lin ............................. 99/476 |
| 2004/0065211 A1 | * | 4/2004 | McNair |

* cited by examiner

Primary Examiner—Reginald L. Alexander

(57) ABSTRACT

An automatic frying apparatus (100) for both deep and shallow frying. Frying apparatus (100) comprises a container (102) having an inner cylindrical wall (102b) installed on the central bottom thereof, so as to emanate from the bottom to substantially the upper portion of container (102) for holding foods and oil, a lid (104) covering on top of container (102), a plurality of stirring blades (108) rotatably and removably installed inside container (102) for stirring foods, a power-drive assembly (110) operationally coupled with blades (108) for driving blades (108) through repeating stirring cycles, a coupling device (106) for coupling in between assembly (110) and blades (108), a venting device (200) for filtering and deodorizing cooking fumes, and a blowing device (202) for forcing fresh air into frying apparatus (100) for moisture removal from thereinside. Blades (108) sweep across food pieces intermittently, such that blades (108) dwell for a predetermined dwell period starting near the end of each stirring cycle. This intermittent operation favors better agitation of food pieces and affords relief from constant stirring of food pieces at a higher speed. Food pieces are partially immersed in the boiling oil, and therefore, less oil is required for frying foods, thereby, causing less energy consumption, less fat absorption by the food, less time for cooking, and less used oil for disposal. The frying process is fully automatic and requires minimal human involvement and chore.

39 Claims, 14 Drawing Sheets

AUTOMATIC FRYING APPARATUS FOR BOTH DEEP AND SHALLOW FRYING

BACKGROUND OF INVENTION

This invention generally relates to cooking/food processing apparatuses. More specifically, this invention relates to automatic frying apparatuses for both deep and shallow frying.

Fried foods, such as fried shrimp, fried fish, fried chicken, etc., are tasteful. Two of the most important characteristics of fried foods are: outside, golden and crispy; and inside, juicy and tender. There are some issues associated with preparing fried foods at home.

First, the contact of moisture-containing raw foods with hot oil produces grease splattering. Most times, the splattering liquids and food particles reach out of frying apparatuses to considerable distances. These will not only mess up stovetops and surrounding surfaces but also create undue oil burn injuries to the people who are preparing fried foods. The problem of grease fires in the kitchen as well as severe oil burns to people has been well documented.

Second, oil vapor is produced when oil is heated. The people who are preparing fried foods involuntarily inhale considerable amount of cooking fumes during the cooking process. Oil vapor is harmful to human health and might pose long-term health threats to the people who expose themselves to oil vapor on a very regular base.

Third, the oil vapor generated in the cooking process might easily reach much farther in the kitchen or even other rooms and deposit on the furniture, paintings, electrical appliances, etc., causing long-term hazards to home environment.

Fourth, on the other hand, there is an ever-increasing concern over the amount of oil or fat in one's diet for general public. In particular, a low fat diet is desirable in light of related health concerns. Generally, fried foods prepared using conventional methods and cooking wares contain more fat than other foods.

Many products of deep-frying apparatuses or food processing apparatuses are on the market, including the electric frying apparatus taught by U.S. Pat. No. 6,365,878, issued to Lau, on Apr. 2, 2002. These products are equipped with vertically moving baskets and generally require the food to be immersed deep in the frying oil; which means that large quantity of oil is required. The high quantity of oil needed for proper cooking also means high operating cost due to high energy consumption and longer time for cooking. The quantity of oil absorption by the food is prohibitively high, as well.

The disposal of used oil is going to be an environmental issue. Food processing businesses and restaurants might be able to afford expensive equipment for the disposal or treatment of used oil. But general public will find it difficult in dealing with large quantity of used oil.

Another issue is that the user has to repeatedly stir or turn the food around to separate the food pieces during frying, such that the food can be cooked more uniformly.

Over years, various devices have been developed to address these problems associated with frying at home.

U.S. patent application Ser. No. 10/249,240, filed by myself, on Mar. 25, 2003, teaches a forced venting fry utensil. The fry utensil comprises a container for holding foods and oil, a lid covering on top of the container, a blowing device for forcing fresh air into the fry utensil for facilitating the evaporation of food moisture, and a venting device for filtering and deodorizing cooking fumes.

The aforementioned prior art is concentrating on the issue of splattering of hot grease and food particles and cooking fume treatment. However, It fails to address the necessity of automating frying processes. Without frying process automation, especially at home, consumers have to stir the food or turn the food over in the middle of frying processes. In this case, the generation of hot oil splattering and the escape of oil vapor into the room are still inevitable.

Some patents have been granted in the area of automatic frying apparatuses.

U.S. Pat. No. 5,027,697, issued to De Longhi, on Jul. 2, 1991, teaches a rotating oblique basket fryer for cyclic immersion cooking; which facilitates the elimination of moisture in the food, accelerates the heat exchange process, and favors uniform operating temperatures.

U.S. Pat. No. 5,543,166, issued to Masel, et al., on Aug. 6, 1996, describes a cooking appliance including a drum for receiving the food articles to be cooked. The appliance is characterized in that the finished food is spun about a central axis to spin out unwanted excess of oil.

U.S. Pat. No. 5,611,265, issued to Ronci et al., on Mar. 18, 1997, describes a combination of fryer and charbroiler food cooking apparatus. The excessive oil is separated from the fried foods using centrifugal means.

U.S. Pat. No. 6,453,801, issued to Masel, et al., on Sep. 24, 2002, teaches a cooking appliance and method for cooking food articles by means of a rotary drum. The appliance is characterized in that a liquid container is selectively movable to a raised or lowered position to adjust the oil level with respect to the food articles.

The aforementioned prior arts are concentrating on automatic frying apparatuses with special emphasis on low fat frying. The low fat characteristic is mostly achieved by mechanical means, e.g., centrifugal means. This makes the prior art apparatuses less appealing because mechanical separation devices generally require a large size of the frying apparatus. The manufacturing cost is higher and consequently the higher prices the general public pays to buy these apparatuses. Another reason why these prior art apparatuses do not prevail lies on the fact that the mechanisms for achieving targeted objectives are, to some extent, too complicated, which, again, drives up the manufacturing cost. The effort spent on cleaning these apparatuses after use is another important factor. In addition, they fail to address the issue of cooking fume hazards and moisture removal from inside the frying apparatus.

Low fat frying can be, alternatively, achieved by means of how the food is processed. The key point is that the moisture content residing in the raw food, especially in the surfaces of food pieces, has to be removed as quickly as possible. The removal of the surface moisture content greatly favors less fat absorption, less time for frying, less energy consumption, and foods of great looking, taste, and texture.

U.S. patent application Ser. No. 10/249,399, filed by myself, on Apr. 5, 2003, teaches an automatic frying apparatus having a perforated rotary drum for holding and frying foods removably installed inside a container, and a forced venting system for forcing fresh air into the frying apparatus for facilitating food moisture evaporation and cooking fume treatment. The frying apparatus overcomes all the shortcomings of prior art products.

However, all the prior arts, including the one proposed by myself in U.S. patent application Ser. No. 10/249,399, have a very important drawback; they are specifically addressing the issues associated with deep-frying. These prior art products cannot be used for shallow frying, in another word, stir-frying, which is a widely used food preparing/processing method, especially in oriental cuisine. Shallow frying requires constant stirring. Therefore, grease splattering and oil vapor hazards are among the most important issues to deal with. On the other hand, shallow frying requires much more human effort, whereby automation is highly desired.

Therefore, it remains desirable to provide frying apparatuses that can be used for both deep and shallow frying, that are automatic to minimize the human involvement or chore during the frying process, that favors homogeneous heating of foods, that require minimal quantity of oil for frying foods, that can effectively and efficiently evaporate the surface moisture content of food pieces to achieve the characteristic of low fat absorption and great looking, taste, and texture of foods, that are inexpensive to manufacture and simple and easy to use, and also that are environment, people, and home friendly.

SUMMARY OF INVENTION

Accordingly, the present invention is an automatic frying apparatus for both deep and shallow frying. This frying apparatus comprises a container having an open top for holding foods and oil, a lid covering on top of the container for closing up the open top, a plurality of stirring blades rotatably and removably installed inside the container, on the central bottom, a power-drive assembly operationally coupled with these stirring blades for driving these stirring blades through repeating stirring cycles for facilitating homogeneous heating, a blowing device for forcing fresh air into the frying apparatus for facilitating evaporation of moisture content residing in the surfaces of food pieces, and a venting device for filtering and deodorizing cooking fumes.

These stirring blades sweep across food pieces in an intermittent operation, in which they dwell for a predetermined dwell period near the end of each stirring cycle. This intermittent operation affords relief from constant stirring of food pieces at a higher speed, thereby favoring foods of great texture and looking. Food pieces are partially immersed in the boiling oil, and therefore, less oil is required for frying. Cooking fumes are treated right before leaving the frying apparatus, whereby, this fry apparatus of the present invention is people and home environment friendly.

Accordingly, the followings are some of the objects, features, and advantages of the present invention:

It is an object of the present invention to provide a frying apparatus for use to prepare tasteful fried foods for both deep and shallow frying.

It is another object of the present invention to provide a frying apparatus that is automatic in separating, stirring, and turning over food pieces for facilitating moisture evaporation and uniform heating, so as to minimize the human involvement or chore during the frying process.

It is a further more object of the present invention to provide a frying apparatus that is environment, people, and home friendly.

It is a still further more object of the present invention to provide a frying apparatus that requires minimal quantity of oil for frying foods, and consequently causes less energy consumption, less used oil for disposal, and less time for cooking.

It is a still further more object of the present invention to provide a frying apparatus that is of durable and reliable constructions, easily and efficiently manufactured and marketed, and at the same time economically available to the general public.

It is a feature of the present invention that this frying apparatus has a plurality of stirring blades rotatably and removably installed on the central bottom of the container for stirring foods. These blades sweep across food pieces in an intermittent operation, in which they dwell for a predetermined interval of time near the end of each sweeping cycle and then automatically begin another cycle of operation. This intermittent operation affords relief from constant stirring of food pieces at a higher speed, thereby favoring foods of great texture and looking.

It is another feature of the present invention that this frying apparatus has a forced venting system including a blowing device to force fresh air into the frying apparatus for facilitating moisture removal from thereinside and a venting device for removing the oil vapor content in the grease-laden air generated during the frying process before the air is exhausted into the room.

It is a further more feature of the present invention that the food to be fried is partially immersed in the boiling oil, thereby reducing the requirement on the quantity of oil for proper frying, and consequently this frying apparatus of the present invention consumes less energy and takes less time for cooking.

It is a still further more feature of the present invention that this frying apparatus fries foods in a programmed automatic manner; therefore, minimal human involvement or chore is rendered.

It is an advantage of the present invention that this frying apparatus is virtually hand-free for frying foods and can be used for both deep and shallow frying.

It is another advantage of the present invention that this frying apparatus is environment, people, and home friendly.

It is a further more advantage of the present invention that this frying apparatus is easy to operate, cheap to manufacture, and providing large value to businesses and general public.

Further more features and advantages of the present invention will be readily appreciated, as the same becomes better understood after reading the subsequent description when considered in connection with the accompanying drawings.

BRIEF DESCRIPTION OF DRAWINGS

FIG. 12 illustrates an alternative design of frying apparatus 100 of FIG. 1, a frying apparatus 100a.

FIG. 16 illustrates an alternative design of frying apparatus 300 of FIG. 13, a frying apparatus 300a.

FIG. 18 illustrates an alternative design of frying apparatus 400 of FIG. 17, a frying apparatus 400a.

DETAILED DESCRIPTION

Figure 1:
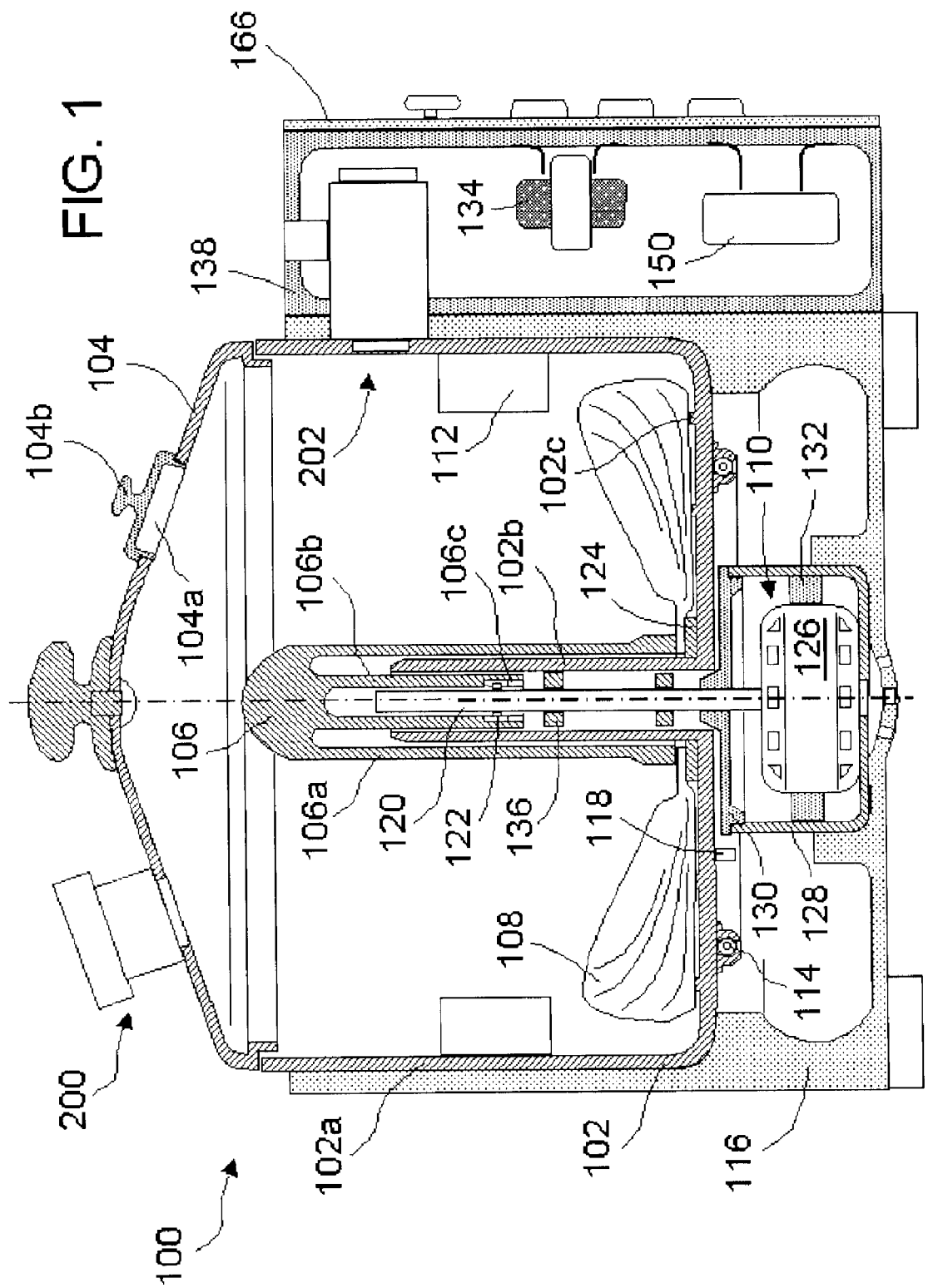
FIG. 1 illustrates a cross-sectional view of an embodiment of the present invention, a frying apparatus 100.

Reference is made to FIG. 1, which illustrates a cross-sectional view of an embodiment of the present invention, a frying apparatus 100. Frying apparatus 100 comprises a container 102, a lid 104, a coupling device 106, a plurality of stirring blades, generally designated as 108, a power-drive assembly 110, a venting device 200, and a blowing device 202.

Container 102, having an open top, an outer wall 102a, and an upstanding inner cylindrical wall 102b, is provided for holding foods and oil. Cylindrical wall 102b is installed on the central bottom of container 102, so as to emanate from the bottom thereof upward to substantially the open top, forming a central aperture therein. Container 102 is, preferably, coated with a non-stick material.

A plurality of co-rotation preventing blades, generally designated as 112, is installed inside container 102, on outer wall 102a, for preventing the food from co-rotating with stirring blades 108, as blades 108 rotate. Blades 112, disposed on positions slightly higher than blades 108, generally extend vertically. The size of blades 112 can be substantially different based on specific designs of container 102.

A heating element 114, installed on the outside surface of the bottom of container 102, is provided for heating foods and oil disposed inside container 102. Heating element 114 is in a heat-transferable condition, e.g., in physical contact, with the bottom of container 102, such that when heating element 114 heats up upon connection with an electricity source, foods and oil therein will also heat up. Heating element 114 can be electrical resistance type heaters or many other types, such as high-intensity infrared lamps, as known to those skilled in the art and suggested by this invention disclosure.

A container support 116, installed on the bottom and side of container 102, is provided for furnishing a bottom support for container 102, such that frying apparatus 100 can stand on a flat surface, e.g., a kitchen counter top. Another function of support 116 is insulating the bottom of container 102. The sidewall of support 116 can extend upward, covering substantially large area of outer wall 102a of container 102 for minimizing heating energy loss. In this case, support 116 serves as an outer housing.

A temperature sensor 118 is provided for measuring the temperature of the frying oil, as an input variable to be controlled. Sensor 118 is installed at an appropriate position on the bottom of container 102, or any other suitable positions. When the temperature of the frying oil is above the user's desired one, the electrical power to heating element 114 will be shut down to better meet the user's desired frying requirement and to save energy.

Lid 104 is provided for covering on top of container 102 for closing up the open top thereof. Lid 104 can be made of a transparent material, or a metal material but has an observation window (not shown), made of a transparent material, for observing the frying process by the user.

An opening 104a is provided on lid 104, disposed at a suitable location, for adding ingredients to the food inside container 102 by the user in the middle of frying processes. A cap 104b is provided for covering up opening 104a.

Figure 2:
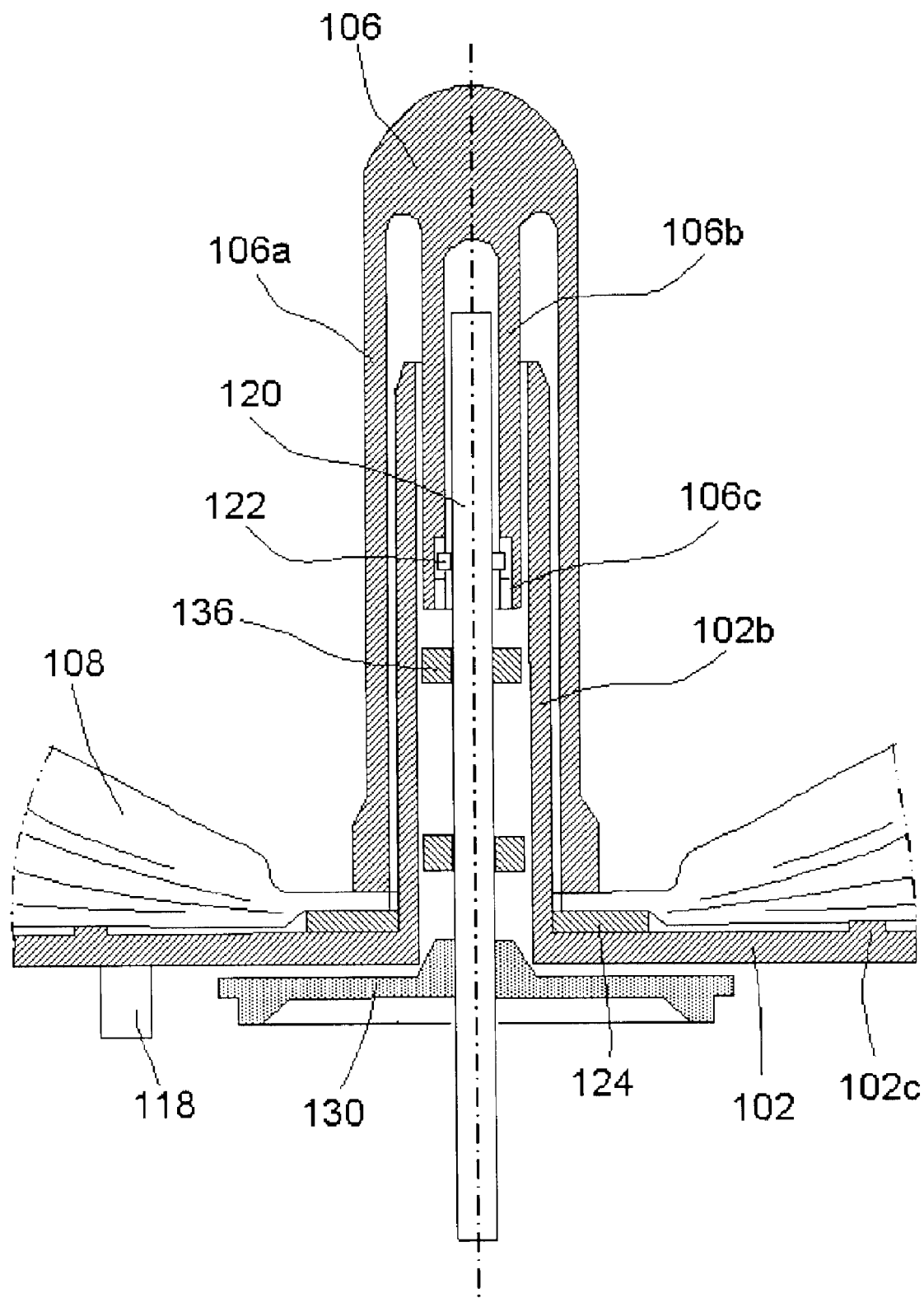
FIG. 2 illustrates an exploded cross-sectional view of coupling device 106.

FIG. 2 illustrates an exploded cross-sectional view of coupling device 106. Coupling device 106, having an outer cylindrical wall 106a and an inner cylindrical wall 106b, is provided for coupling a main shaft 120 from power-drive assembly 110 and stirring blades 108 for transferring rotation power. Walls 106a and 106b are substantially co-axial to cylindrical wall 102b of container 102 and are fixedly connected together on the upper portion thereof. The lower portion of wall 106a is engaged with blades 108. The lower portion of wall 106b has a cross-channel coupling element 106c, or other types of coupling elements, which lockably receives main shaft 120 and a main shaft pin 122. Pin 122 is mounted on the upper portion of main shaft 120, running across a diameter thereon for coupling main shaft 120 and coupling element 106c. In operation, wall 106a is routed over wall 102b and wall 102b is routed over wall 106b. The upper portion of main shaft 120 threads inside wall 106b. Minimal clearance is desired among these walls for ideal performance.

Blades 108, rotatably and removably installed inside container 102 on the central bottom thereof, are provided for stirring foods. There is a central aperture on blades 108 to permit threading over cylindrical wall 102b.

A stirring blade spacer 124, fixedly installed on the central bottom of container 102 around the bottom portion of wall 102b, is provided for supporting blades 108.

Figure 3:
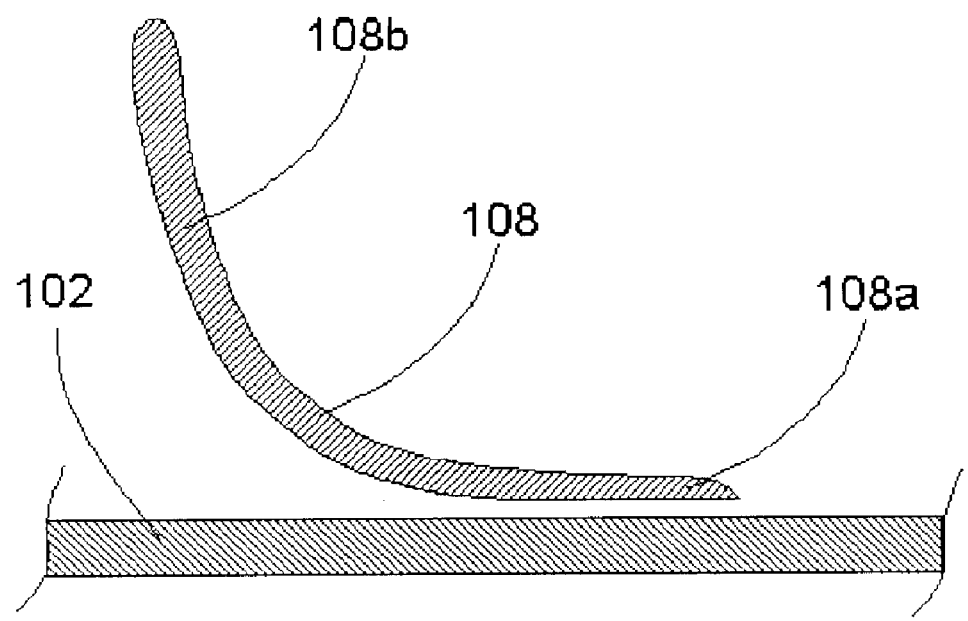
FIG. 3 illustrates an exploded cross-sectional view of blades 108.

FIG. 3 illustrates a cross-sectional view of blades 108 in relation to the bottom of container 102. The cross-section generally forms a plow-like configuration. The front portion thereof, generally designated as 108a, is close to the bottom of container 102 with a small predetermined clearance for better scooping up food pieces. The rear portion thereof, generally designated as 108b, extending gradually upward, serves for lifting up/turning over food pieces. The clearance between front portion 108a and the bottom of container 102 is minimized for ideal performance.

However, when the clearance is small, it is inevitable that blades 108 will scrape on the bottom of container 102, causing worn-out of blades 108 and energy loss due to friction of large area. To deal with this dilemma, a plurality of circular protrusions, generally designated as 102c, fixedly installed on the bottom of container 102, is proposed in this invention disclosure. Reference is made to FIGS. 1 and 2 for the configuration of protrusions 102c. Protrusions 102c provide further support to blades 108, in addition to spacer 124, which is more clearly shown in FIG. 2. A predetermined small width of protrusions 102c is desired for providing adequate support and, at the same time, minimizing friction. In the case for a container coated with a non-stick material, the top surface of protrusions 102c is, preferably, not coated. Local areas on blades 108, which are in the vicinity of protrusions 102c, can have a different material for durability consideration. The height of protrusions 102c is, preferably, small, e.g., less than 1 mm, for ideal performance of blades 108 in scooping up food pieces and avoiding sticking. Protrusions 102c can readily have many other configurations, or pattens.

The speed, at which blades 108 sweep across food pieces, is important. For too low speeds, blades 108 cannot scoop up food pieces and therefore food pieces cannot be agitated adequately to achieve the desired effect of homogeneous heating and the evaporation of food moisture. Co-rotation of food pieces with blades 108, as blades 108 rotate, is going to be a big issue. Therefore, a higher speed is desirable for good performance. But, on the other hand, for continuous operation of blade sweeping, when the speed is high, food pieces are agitated too much, for too long time, such that the crispy surfaces of food pieces are damaged, which, in turns, causes frying oil to be wasted due to too many tiny food particles in the oil. In addition, the worn-out of blades 108 and energy loss due to friction between blades 108 and the bottom of container 102 are going to be serious problems.

To solve this dilemma, an intermittent operation of blade sweeping is proposed in this invention disclosure. In this intermittent operation, blades 108 dwell for a predetermined interval of time after one or two rounds of sweeping, referred as one stirring cycle, and then automatically begin another cycle of operation. This intermittent operation affords relief from constant stirring of food pieces at a higher speed, prolongs the life of blades 108 and power-drive assembly 110, and saves some energy required for driving blades 108, as compared with the continuous operation. This intermittent operation also favors foods of great texture because during the dwell period, the food pieces have adequate time to form crispy surfaces; which, in turns, favors foods of great looking. A computer control method and an electronic control circuit for achieving this intermittent operation are going to be disclosed later on, when the control portion of frying apparatus 100 is discussed.

Reference is, again, made to FIG. 1. Power-drive assembly 110 includes a drive motor 126 and main shaft 120.

A motor housing 128, having an open top, is provided for housing motor 126. Motor housing 128 is installed on the central bottom of support 116. A cap 130 is provided for covering on top of motor housing 128 for closing up the open top thereof. There is a central aperture on cap 130 for permitting main shaft 120 to thread therethrough.

Motor 126 is installed inside motor housing 128 through a bracket 132 and is operationally connected to a DC adapter 134.

Main shaft 120 is operationally coupled with motor 126, directly for a low-speed motor or via some gears or belt-pulley devices for a high-speed motor. Main shaft 120 is substantially co-axial to cylindrical wall 102b and threads therein, so as to emanate from the bottom of container 102 to substantially the upper portion of wall 102b.

Reference is made to FIG. 2, again. On the upper portion of main shaft 120, coupling pin 122 is provided for the engagement with coupling element 106c of coupling device 106. Pin 122 has a predetermined length so as to conveniently slide in the opening on the lower portion of cylindrical wall 106b for removably locking on coupling element 106c.

A plurality of main shaft supporting elements, generally designated as 136, installed on the upper portion of main shaft 120, is provided for further supporting main shaft 120, against cylindrical wall 102b. Elements 136 have a ring-like configuration and are slidably threaded inside cylindrical wall 102b, together with main shaft 120. The clearance between elements 136 and cylindrical wall 102b is minimized for ideal performance. Bearings are ideal options for elements 136 for minimizing power loss due to friction.

Figure 4:
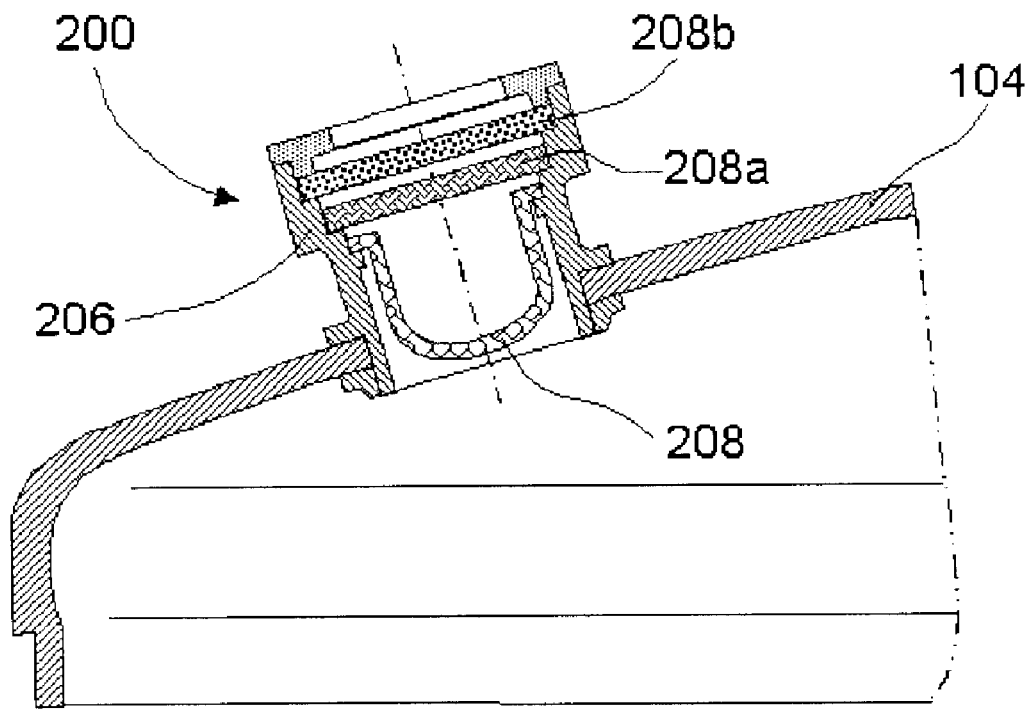
FIG. 4 illustrates an exploded cross-sectional view of venting device 200.
Figure 5:
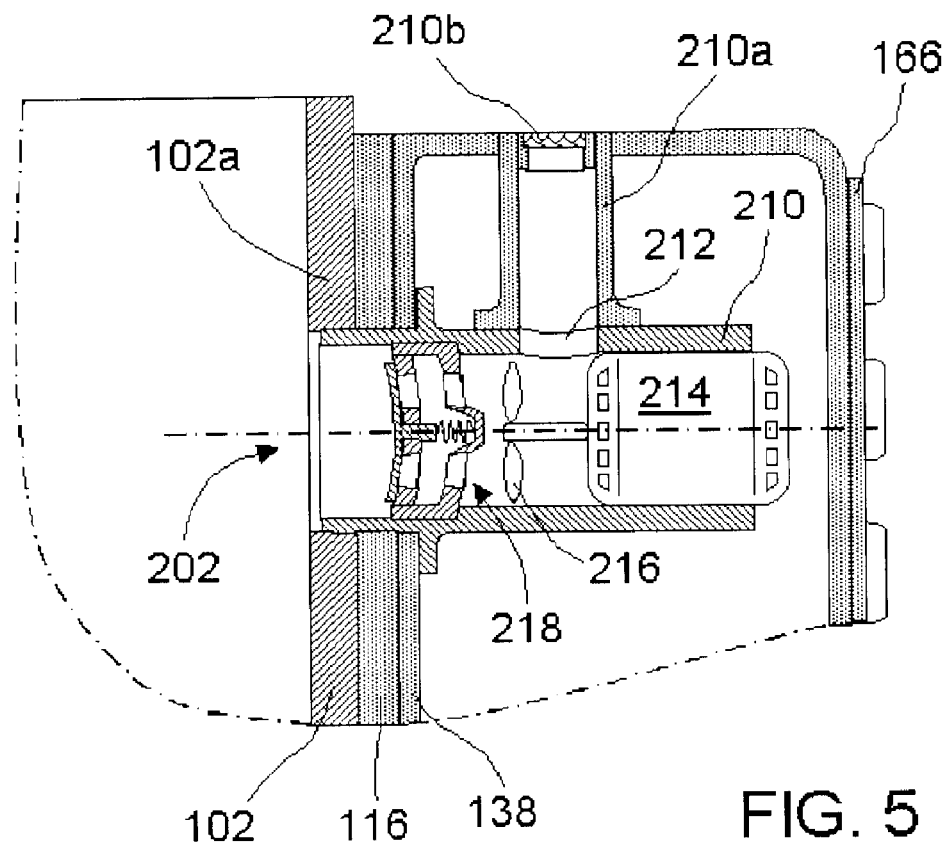
FIG. 5 illustrates an exploded cross-sectional view of blowing device 202.

Reference is, now, made to FIG. 4 and FIG. 5, which illustrate an embodiment of a forced venting system including a venting device 200 and a blowing device 202 of FIG. 1.

Venting device 200 includes a venting conduit 206 and a venting filter 208. The first end of venting conduit 206 is mounted on lid 104. There is an opening on lid 104 inline with venting conduit 206 for allowing cooking fumes to be forced out therethrough. Venting conduit 206 also serves as a bracket for holding venting filter 208. Venting filter 208 is removably engaged with the second end of venting conduit 206. Venting filter 208 further includes a disposable paper filter 208a and/or a disposable activated charcoal filter 208b, together, as an integrated filter.

Venting filter 208 is provided to trap the grease impurities in the grease-laden air forced out from inside frying apparatus 100. Venting filter 208 is, preferably, made of one or multiple layers of metal meshes, such as aluminum ones. Metal meshes have different sizes of meshes and overlap each other. When cooking fumes pass therethrough, the oil particles will be trapped thereon. Filters 208a and 208b are provided to further remove the remaining oil vapor and chemical contents in the cooking fumes and for removing the cooking fume odors before the air is exhausted into the room.

Blowing device 202 includes an in-take conduit 210, a blowing motor 214, a fan 216, and a one-way valve 218.

The first end of in-take conduit 210 is mounted on the upper portion of container 102. There is an opening on the sidewall of container 102 inline with in-take conduit 210 for allowing fresh air to be forced into frying apparatus 100. There is an aperture 212 on in-take conduit 210. Aperture 212 functions as an air inlet. An inlet conduit 210a extends from aperture 212 to the outside space, such that fresh air from outside atmosphere can be readily drawn into frying apparatus 100. A filter 210b, made from metal meshes, is provided for preventing some large particles from being drawn therein. In-take conduit 210 also serves as a bracket for holding motor 214 in position. Motor 214 is removably coupled with the second end of in-take conduit 210. Fan 216 is connected to motor 214 on the shaft and inserted inside in-take conduit 210. Motor 214 is operationally connected to adapter 134, which is shown in FIG. 1.

Figure 6:
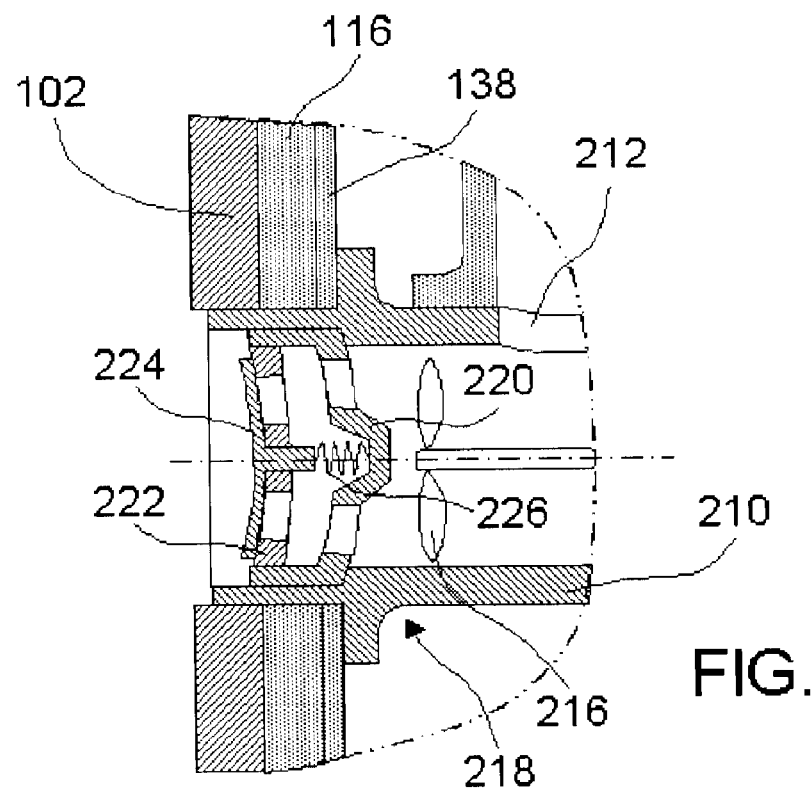
FIG. 6 illustrates an exploded cross-sectional view of one-way valve 218 of FIG. 5.

As shown in FIG. 6, which illustrates an exploded cross-sectional view of one-way valve 218 of FIG. 5. Valve 218 includes a valve housing 220, a valve body 222, a covering piece 224, and a biasing spring 226. Valve housing 220 is engaged with the first end of in-take conduit 210. There are apertures on valve housing 220 for allowing air to pass therethrough. Valve body 222 is engaged with the open end of valve housing 220. There are apertures on valve body 222 for allowing air to pass therethrough. Covering piece 224 covers on valve body 222 for closing and opening valve 218. There is a central protrusion on covering piece 224. The central protrusion is slidably inserted into a central aperture on valve body 222, such that the protrusion can slide along the central aperture for a predetermined distance. Spring 226 is attached between the protruding end of the protrusion and valve housing 220, such that spring 226 is biased in slight tension, thereby, pulling covering piece 224 toward/against valve body 222 for closing up valve 218.

When blowing device 202 is in working condition, the air pressure generated by fan 216 forces covering piece 224 to slide away from valve body 222, such that valve 218 is in opening state for allowing air to pass therethrough. Valve 218 is provided for preventing cooking fumes inside frying apparatus 100 from escaping through blowing device 202 while blowing device 202 is temporarily not in working condition.

Those skilled in the art will appreciate in view of this invention disclosure that many other suitable valve designs are readily applicable for this application of the present invention.

Venting device 200 and blowing device 202 can be alternatively installed on frying apparatus 100 at many other positions. For example, venting device 200 can be alternatively installed on the upper portion of container 102 and blowing device 202 can be alternatively mounted on lid 104. These variations are, therefore, covered by this invention disclosure.

Venting device 200 is provided for cooking fume treatment. Compared with prior art products, which allow cooking fumes to escape freely, this centralized venting system design vents cooking fumes in a controlled manner, such that heating energy is better preserved for a more efficient frying apparatus.

Blowing device 202 is provided for forcing moisture content out of frying apparatus 100, especially at the early stage of a frying process, such that frying apparatus 100 can fry foods of great taste, great texture, and great looking. This also favors less cooking time and, as a result, less energy consumption. However, there is some heating energy loss associated with using blowing device 202. Therefore, the use of blowing device 202 should be in a controlled manner.

Stronger blowing favors better inside airflow for better facilitating moisture removal. However, Continuously strong blowing will cause excessive heating energy loss. To solve this dilemma, an intermittent venting operation is proposed in this invention disclosure. In this intermittent venting operation, fan 216 dwells for a predetermined interval of time near the end of a blowing cycle, e.g., of 10 seconds, and then automatically begins another cycle of operation. An electronic control circuit for achieving this intermittent operation is going to be disclosed later on, when the control portion of frying apparatus 100 is discussed.

Immediately after the frying is satisfactorily accomplished, the food is still sizzling hot and there is still residual cooking fume residing inside frying apparatus 100. Blowing device 202 can be used to bring in fresh air to cool the food down to a predetermined temperature and, at the same time, to purge the residual cooking fumes out through venting device 200. This process greatly favors safety of food handling, home environment protection, and foods of great texture and looking.

The above-discussed forced venting system is good for both deep and shallow frying. For deep-frying it facilitates the evaporation for food surface moisture. For shallow frying, especially for frying vegetables, it favors foods of great looking. It is a well-known fact that when fried using a conventional frying pan with the lid covering on top thereof, green vegetables tend to become yellowish.

Reference is made to FIG. 1, again. A control housing 138 is provided for housing a control module 150. Control housing 138 is installed on the sidewall of container 102.

Control module 150, installed inside housing 138, is provided for controlling various functions of frying apparatus 100, such as the oil temperature for frying foods, motor speeds for rotating blades 108, and the speed at which blowing motor 214 is rotating.

Figure 7:
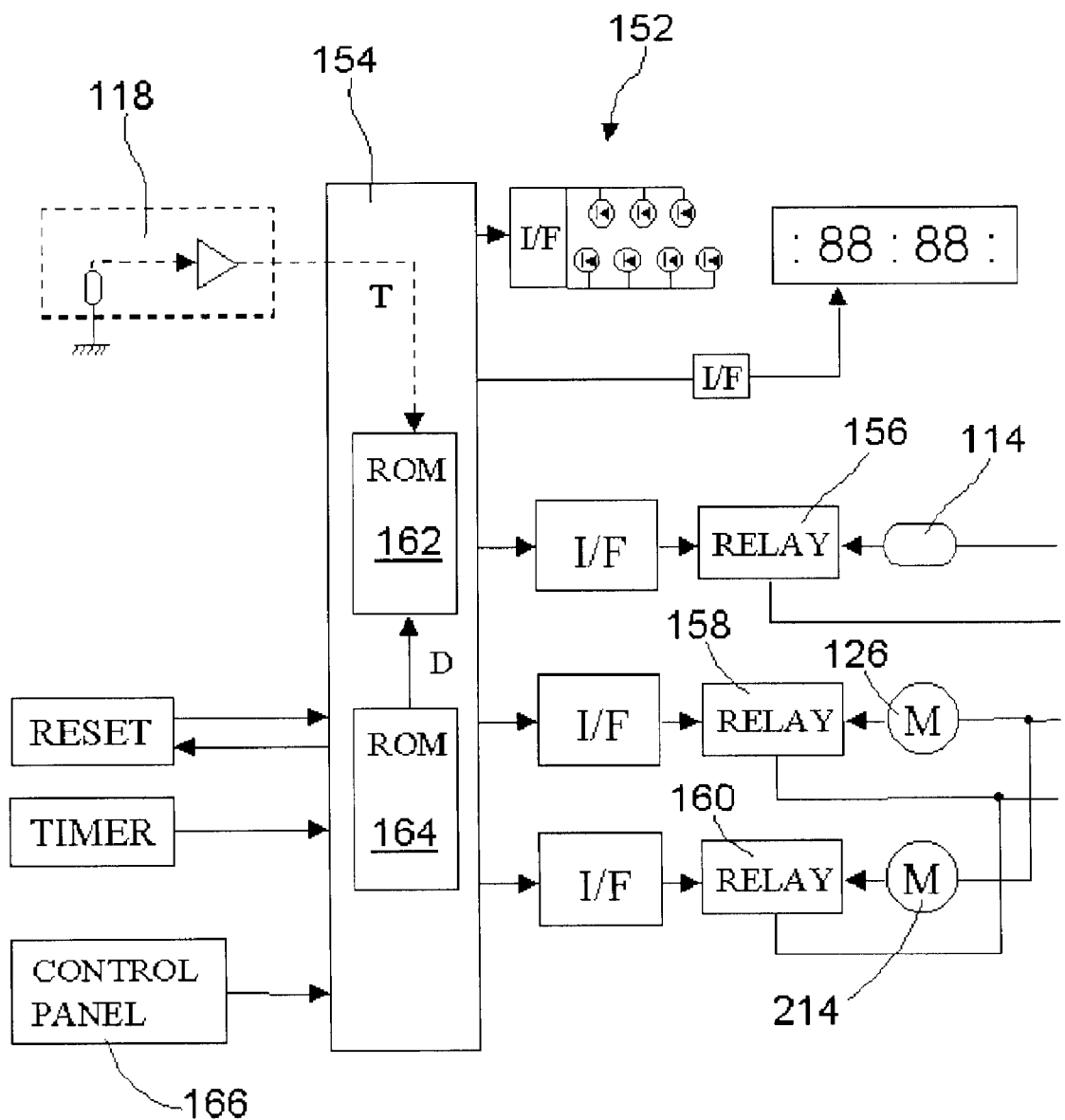
FIG. 7 illustrates a blocked diagram of control circuit 152 for frying apparatus 100.

Control module 150 includes a control circuit 152, as the blocked construction diagram shown in FIG. 7. Circuit 152 comprises a microcomputer 154, which controls various functions of frying apparatus 100, a relay 156, which activates heating element 114, a relay 158, which activates motor 126, and a relay 160, which activates motor 214.

Microcomputer 154 is provided with ROM and RAM for data memory, and further provided with I/O ports A/D converters as interfaces. The aforementioned ROM's comprises a ROM 162 containing control programs related to the performance of all frying processes and a ROM 164, which memorizes referenced data.

Temperature sensor 118 is provided for measuring the oil temperature, which is taken by microcomputer 154, as an input variable to be controlled. When the temperature of the frying oil is above the user's desired one, the electrical power to heating element 114 will be shut down by relay 156 to better meet the user's desired frying requirement and to save energy.

Computer 154 can be such programmed that relay 158 activates motor 126 intermittently with a bias toward a longer dwell after each stirring cycle of one or two rounds of rotation. In the same manner, an intermittent venting operation can be programmed with relay 160 activating motor 214 intermittently.

DC adapter 134 is installed inside control housing 138, as shown in FIG. 1. Adapter 134 provides electricity power to control circuit 152 and elements, like indicators, beepers, LCD, etc., and to motors 126 and 214, as well.

A control panel 166, attached to control housing 138, as shown in FIG. 1, is provided for supporting elements, like switches, indicators, adjusting knobs, beepers, LCD, and so on.

Figure 8:
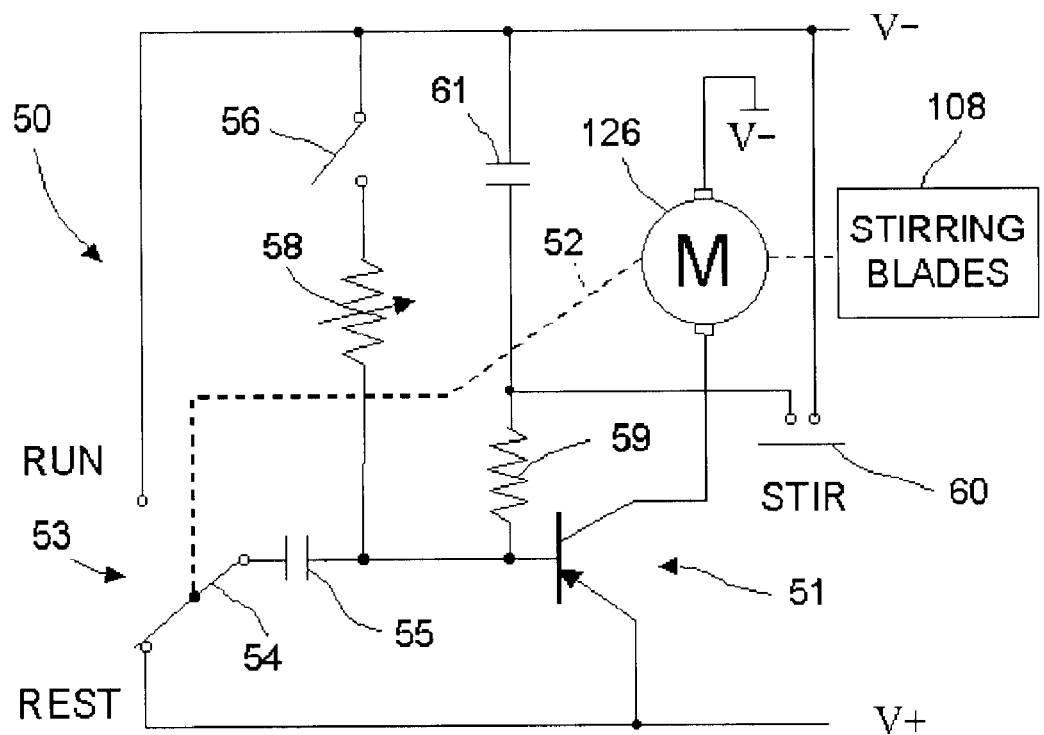
FIG. 8 illustrates a schematic diagram of control circuit 50 for providing the intermittent operation of blade sweeping for frying apparatus 100.

Reference is made to FIG. 8, which illustrates a schematic diagram of a control circuit 50 for providing the intermittent operation of blade sweeping for frying apparatus 100.

As shown in FIG. 8, drive motor 126 is operationally coupled with blades 108 for providing rotation power. Motor 126 has a first terminal, which is connected to V−, the negative pole of a power source, e.g., DC adapter 134, which is shown in FIG. 1, and a second terminal, which is connected to the collector terminal of a PNP bipolar transistor 51. The emitter terminal of transistor 51 is connected to V+, the positive pole of a power source, e.g., DC adapter 134, which is shown in FIG. 1. Associated with motor 126 is a linkage mechanism 52, which cooperates with a single pole, double throw switch 53, such that the shaft angle of motor 126 controls the switching position. Switch 53 includes a single pole 54, which is connected to the first end of a capacitor 55. Pole 54 may be switched alternately between two throw positions as represented by RUN and REST. The reference RUN refers generally to the position of blades 108 when in sweeping. On the other hand, the reference REST refers generally to the position of blades 108 when in dwelling. The RUN position represents substantially a large portion of a whole round of rotation angle of the motor shaft, e.g., over 80%. The RUN position is associated with V− and the REST position is associated with V+.

A main switch 56 is provided for activating and deactivating the intermittent operation provided by circuit 50. Switch 56 has a first terminal connected to V− and a second terminal connected to the first end of a variable resistor 58.

The second end of capacitor 55 is connected to the second end of resistor 58. Also connected to the second end of capacitor 55 are the base of transistor 51 and the second end of a resistor 59. The first end of resistor 59 is connected to the first terminal of a STIR switch 60, which can activate a STIR feature, a manually activated continuous operation. The second terminal of switch 60 is associated with V−. The first end of resistor 59 is also connected to the second end of a capacitor 61. The first end of capacitor 61 is connected to V−.

Switch 60 is a push button switch for activating the STIR feature. When switch 60 is pushed, the two terminals are connected, which causes the connection of the first end of resistor 59 to V− and, at the same time, causes capacitor 61 to be short-circuited.

With switch 56 in the activated position and switch 60 in the deactivated position, circuit 50 will operate blades 108 intermittently with a variable dwell period at the end of each sweeping cycle. This intermittent operation is achieved through the circuit of transistor 51, switch 53, capacitor 55, and resistor 58.

Now, to start with, suppose motor 126 has not been operating because switch 56 has been in the deactivated position. Also suppose switch 53 has been in the REST position, and thus capacitor 55 has been discharged.

When switch 56 is activated, the potential at the second end of resistor 58 will be lowered to cause transistor 51 to switch to conductive state, thereby energizing motor 126. As soon as motor 126 begins to rotate, switch 53 will be thrown to the RUN position, which causes the first end of capacitor 55 to be connected to V−. Capacitor 55 will then begin to charge so as to make the second end of capacitor 55 positive with respect to the first end thereof. Sufficient base current will be provided through the base of transistor 51 to cause transistor 51 to remain conductive even after capacitor 55 becomes fully charged, thereby causing motor 126 to continue to rotate throughout a full rotation cycle until switch 53 is cycled back to the REST position. When switch 53 cycles back to the REST position, the first end of capacitor is then connected to V+ and capacitor 55 begins to discharge through resistor 58 until the potential at the second end of resistor 58 becomes sufficiently negative relative to V+. During this period of time, transistor 51 is switched to and remains in non-conductive state, thereby stopping motor 126 for a predetermined interval of time. And then, sufficient base current flow resumes, causing transistor 51 to become conductive again, and a new cycle starts.

The length of the dwell interval is determined by the time required for capacitor 55 to discharge. Proper selection of capacitor 55 and resistor 58 will provide desirable dwell intervals.

With resistor 59 and capacitor 61 in addition, a manually activated continuous blade-sweeping feature can be achieved in addition to and in combination with the controllable variable dwell feature. This performance feature is achieved regardless of whether switch 56 is in the activated position or not when switch 60 is pushed. Moreover, it will be seen if switch 56 is in the activated position when switch 60 is pressed, there will be an immediate override of the intermittent operation. The continuous operation will keep on going without any dwell for a predetermined number of cycles, for example, one or two, after switch 60 is released, before the intermittent operation is resumed. If switch 56 is in the deactivated position when switch 60 is pressed, motor 126 will immediately start to rotate. After switch 60 is released, motor 126 will continue for a predetermined number of continuous sweeping cycles and then stops.

When switch 60 is pressed, the first end of resistor 59 is connected to V−. This allows sufficient current to flow through the base of transistor 51 to switch transistor 51 to conductive state, thereby causing motor 126 to start and operate. By proper selection of the value of resistor 59, this mode of operation will occur regardless of the positions of switches 53 and 56, so long as switch 60 is depressed.

At the same time, pressing switch 60 causes capacitor 61 to be short-circuited such that any charge stored therein is discharged through the short circuit to V−. When switch 60 is released, the current flow out of the base of transistor 51 will continue through discharged capacitor 61 until capacitor 61 recharges. As a result, transistor 51 will continue in conductive state and motor 126 will continue to operate at the normal speed. Transistor 51 will continue in conductive state for a predetermined period of time based on the time constant provided by resistor 59 and capacitor 61, which are preferably selected to provide one or two continuous sweeping cycles without any dwell after switch 60 is released.

One important point worth mentioning is that if power-drive assembly 110 has a rotation reduction mechanism, linkage 52 should be set between the output shaft of assembly 110 and switch 53, instead of between motor 126 and switch 53.

If multiple rounds of sweeping are desired for a stirring cycle, before one dwell period, e.g., two rounds of sweeping before one dwell period, a pair of gears, or some other mechanisms, should be provided, with the smaller one installed on the output shaft and the larger one cooperating with switch 53. The transfer-ratio should be 1:2.

The intermittent operation of blade sweeping can be alternatively achieved using a mechanically controlled timer, e.g., a spring-driven timer (not shown). Numerous discrete contact poles can be provided on a circular plate, such that when a needle is rotating around a central shaft, the needle engages with each contact pole in sequence. The angle range of each pole represents a stirring cycle. At the end of each stirring cycle, there is a predetermined dwell period, which is represented by the angle range in between two adjacent poles.

Figure 9:
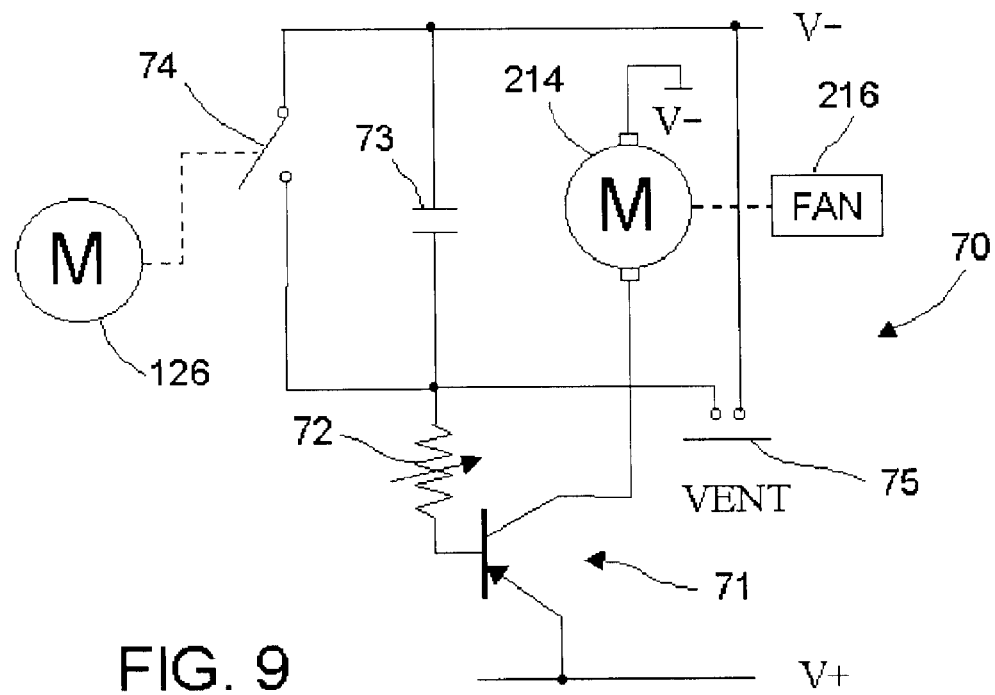
FIG. 9 illustrates a schematic diagram of control circuit 70 for providing the intermittent venting operation for frying apparatus 100.

Reference is made to FIG. 9, which illustrates a schematic diagram of a control circuit 70 for providing the intermittent venting operation for frying apparatus 100.

As shown in FIG. 9, blowing motor 214 is operationally coupled with fan 216 for forcing fresh air into frying apparatus 100. Motor 214 has a first terminal, which is connected to V−, and a second terminal, which is connected to the collector terminal of a PNP bipolar transistor 71. The emitter terminal of transistor 71 is connected to V+. The base of transistor 71 is connected to the second end of a variable resistor 72. The first end of resistor 72 is connected to the second end of a capacitor 73. The first end of capacitor 73 is connected to V−.

Also connected to the first end of resistor 72 are the second terminal of a magnetically activated switch 74 and the first terminal of a VENT switch 75. The first terminal of switch 74 and the second terminal of switch 75 are connected to V−.

Switch 74 is provided for activating and deactivating the intermittent venting operation provided by circuit 70. Switch 74 cooperates with motor 126, such that when motor 126 is in working state, switch 74 is activated and remains in activated condition until motor 126 ceases to work. Switch 75 is a push button switch, which is provided for activating a manually activated continuous venting feature.

When either switch 74 or switch 75 is activated, the first end of resistor 72 is connected to V− and, at the same time, capacitor 73 is short circuited to V−.

With switch 74 in the activated position and switch 75 in the deactivated position, circuit 70 will operate fan 216 intermittently with a variable dwell period at the end of each venting cycle. This intermittent venting operation is achieved through the circuit of transistor 71, resistor 72, capacitor 73, and switch 74, which is conditioned by motor 126.

When motor 126 is in working state, switch 74 is activated, such that the first end of resistor 72 is connected to V–, and capacitor 73 is short circuited to V–. The potential at the second end of resistor 72 is lowered to cause transistor 71 to switch to conductive state, thereby energizing motor 214. As soon as motor 126 stops, switch 74 is deactivated. The current flow out of the base of transistor 71 will continue through discharged capacitor 73 until capacitor 73 recharges. As a result, transistor 71 will continue in conductive state and motor 214 continue to operate at the normal speed. Transistor 71 will continue in conductive state for a predetermined period of time based on the time constant provided by resistor 72 and capacitor 73, which are preferably selected to provide a multiple of a sweeping cycle of blades 108, e.g., five continuous blade sweeping cycles. Motor 214 then dwells for a predetermined interval of time until the next cycle of the intermittent operation of blades 108 starts, when motor 126 activates switch 74, again.

With switch 75 in addition, a manually activated continuous venting performance feature can be achieved in addition to and in combination with the controllable variable dwell feature. This performance feature is achieved regardless of whether switch 74 is in the activated position or not when switch 75 is pushed. Moreover, it will be seen if switch 74 is in the activated position when switch 75 is pressed, there will be an immediate override of the intermittent venting operation. The continuous operation will keep on going without any dwell for a predetermined interval of time after switch 75 is released, before the intermittent venting operation is resumed. If switch 74 is in the deactivated position when switch 75 is pressed, motor 214 will immediately start to rotate. After switch 75 is released, motor 214 will continue for a predetermined interval of time, and then stops.

Figure 10:
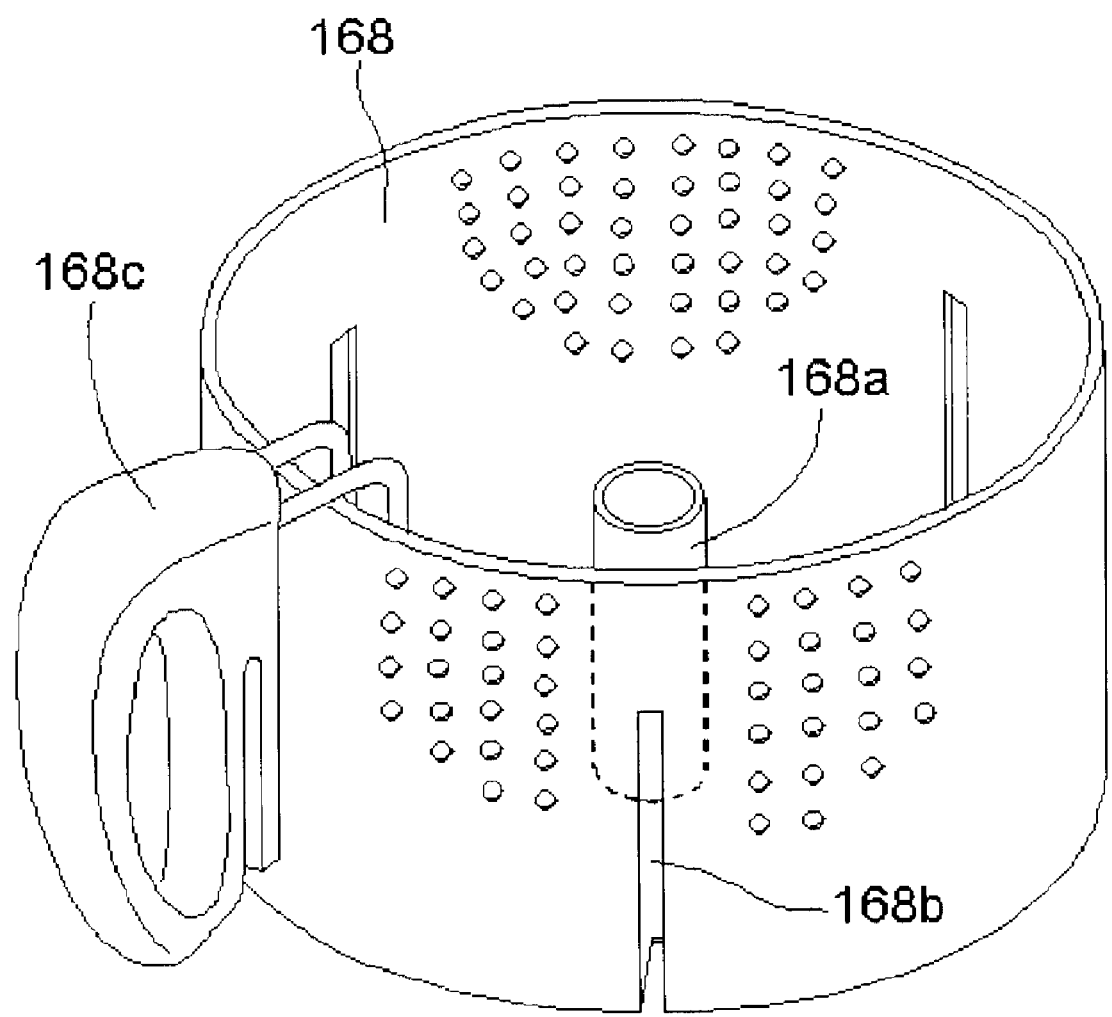
FIG. 10 illustrates a perspective view of perforated basket 168 for use with frying apparatus 100.

FIG. 10 illustrates a perspective view of a perforated basket 168 for use with frying apparatus 100. Basket 168, provided primarily for deep-frying foods, is preferably cylindrical in configuration and has an upstanding inner cylindrical wall 168a defining a central aperture, a plurality of open slots, generally designated as 168b, for removably receiving blades 112, as shown in FIG. 11, and a basket handle 168c for handling basket 168.

Figure 11:
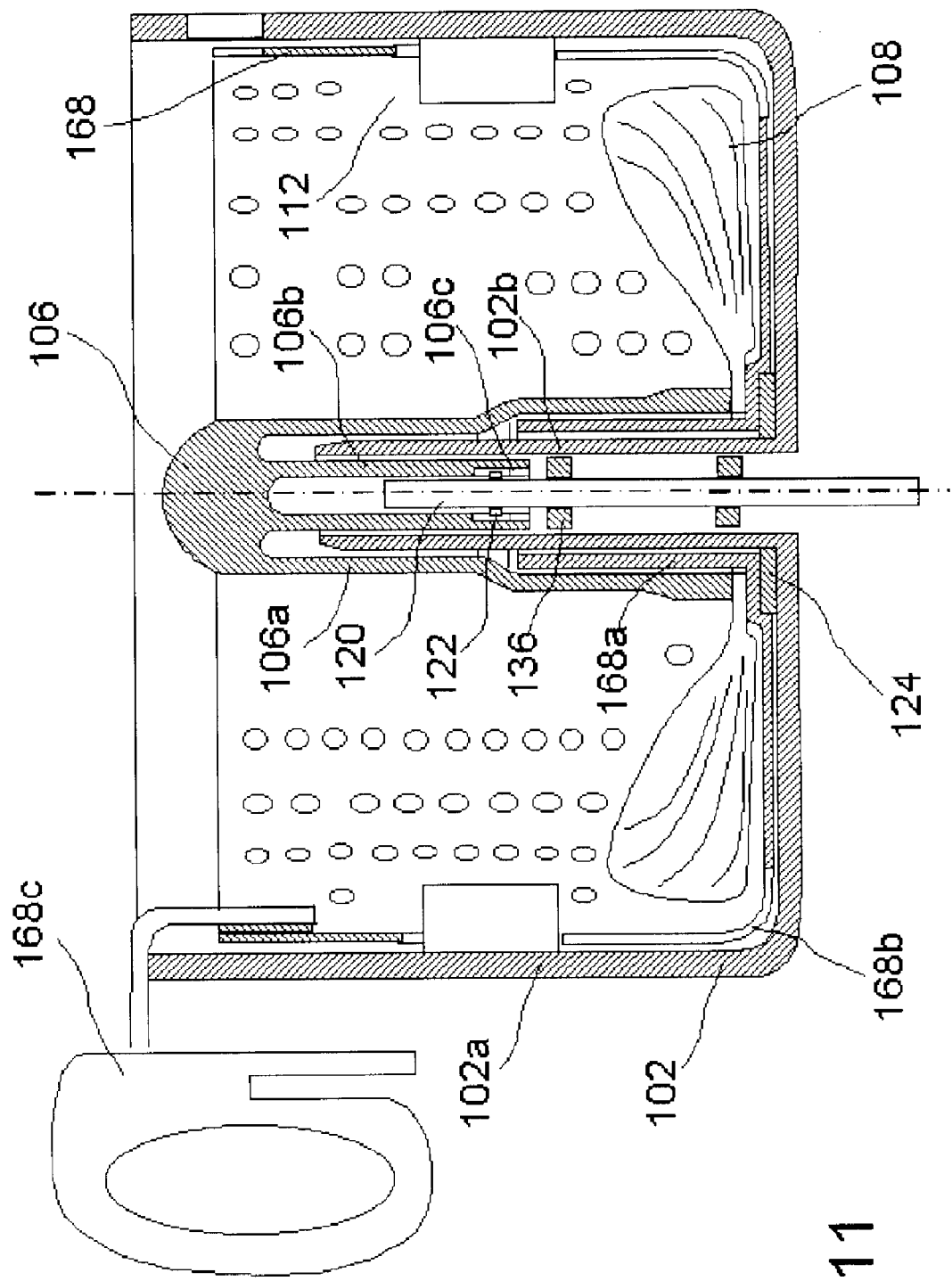
FIG. 11 illustrates a cross-sectional view of basket 168 in an operation position.

FIG. 11 illustrates a cross-sectional view of basket 168 in an operation position. Wall 168a is installed on the central bottom of basket 168, so as to emanate up toward the upper portion thereof, and removably receives cylindrical wall 102b therethrough. Slots 168b slidably receive blades 112, and whereby basket 168 is maintained in position. Handle 168c is installed on the upper portion of basket 168. A small recession, disposed on the upper edge of container 102, is provided to allow the metal rods connecting the main body of handle 168c and the main body of basket 168 to extend from inside to outside of frying apparatus 100. Wall 168a is routed over wall 102b and wall 0.106a is routed over both walls 102b and 168a.

In operation, a user:

First, charges container 102 with oil, and then preheats the oil to a predetermined temperature, preferably, halfway boiling. This step can be one step of a cooking program.

Second, charges container 102 with the food to be fried.

Third, selects an oil temperature, a time duration, a stirring blades rotation speed, and a blowing motor speed, or a program for frying foods, and then pushes on start button for activating the frying process.

The whole frying process is hand-free. The user does not have to be involved with the frying process until the frying is accomplished. The frying apparatus will then beep to remind the user when the frying process is done. The fried food is, now, ready for serving.

Figure 12:
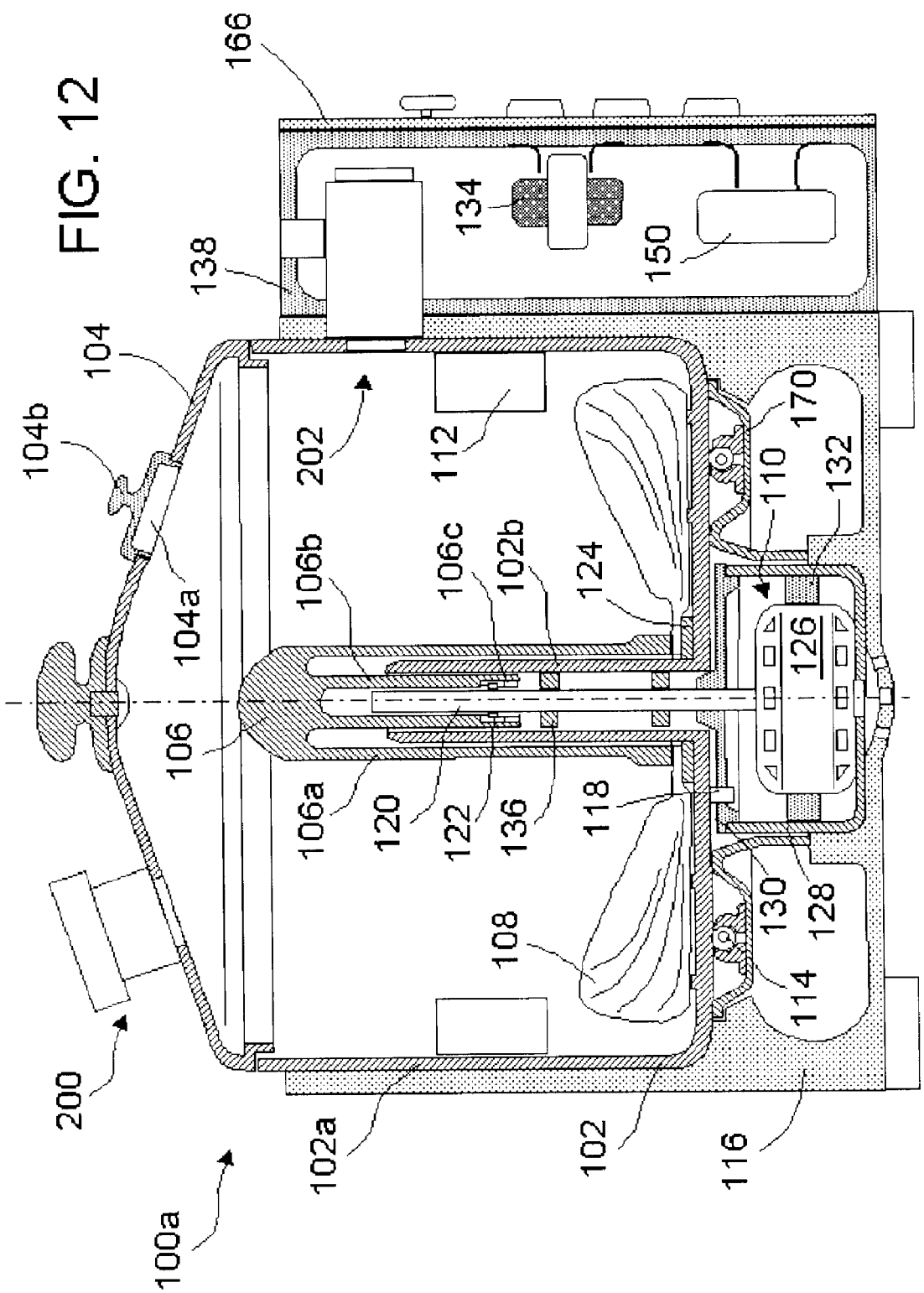

Reference is made to FIG. 12, which illustrates an alternative design of frying apparatus 100 of FIG. 1, a frying apparatus 100a. In this alternative design, a heating element support bracket 170 is provided for supporting heating element 114. Bracket 170 is removably supported by container support 116. Heating element 114 is fixedly installed on bracket 170. Temperature sensor 118 is installed on cap 130 or some other suitable components. Container 102 is removably installed inside container support 116, such that container 102 can be easily taken out for food and used oil handling and for cleaning after use. When container 102 is secured inside the opening of support 116 in an operating position, heating element 114 and sensor 118 are in physical contact with the bottom of container 102.

Figure 13:
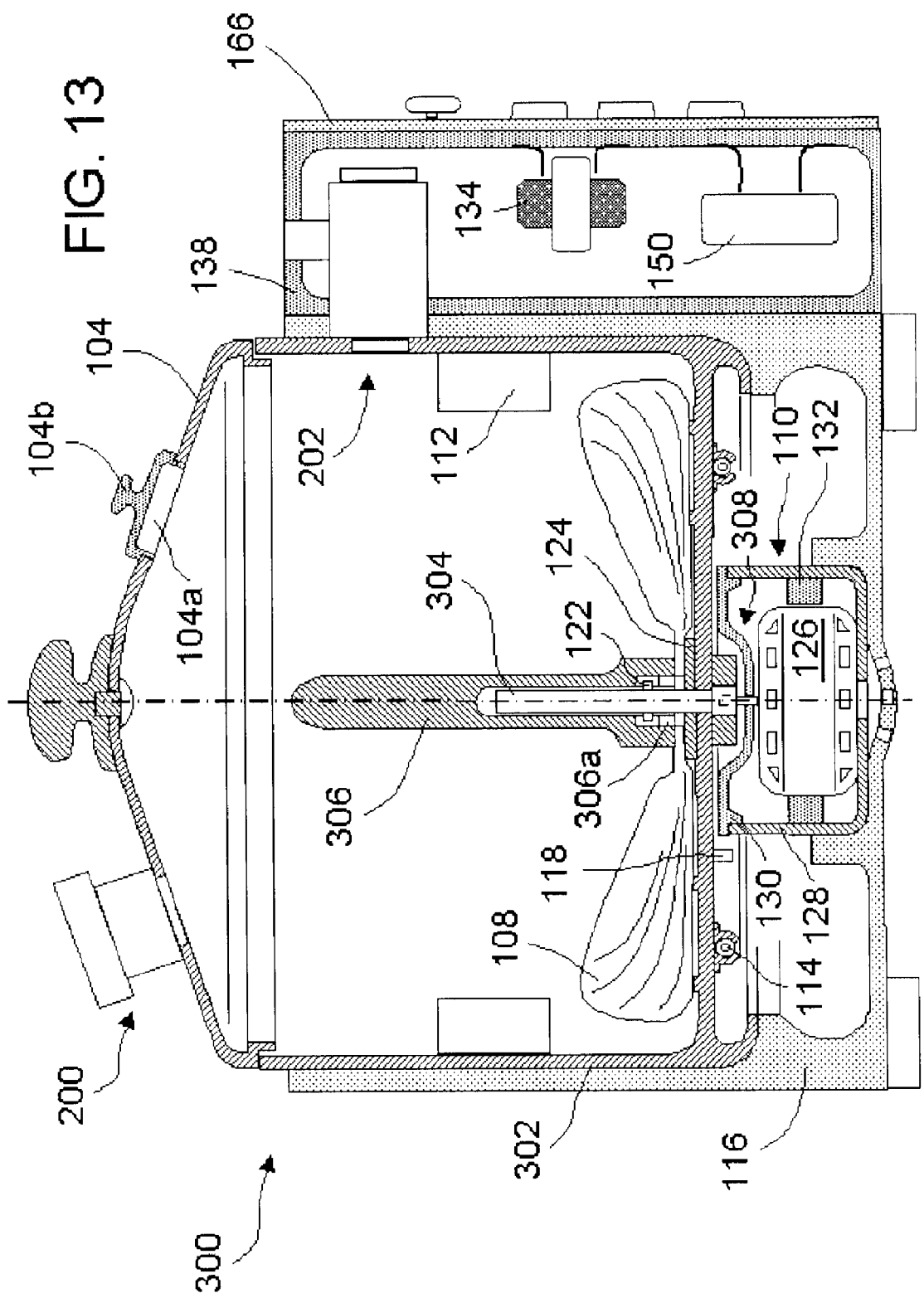
FIG. 13 illustrates a cross-sectional view of another embodiment of the present invention, a frying apparatus 300.

Reference is made to FIG. 13, which illustrates a cross-sectional view of another embodiment of the present invention, a frying apparatus 300. Some components or devices of frying apparatus 300 are similar to those of frying apparatus 100. Similarity is in the sense of both functionality and configuration. Therefore, similar components or devices are denoted with similar reference numbers for avoiding repetitive explanations. Reference is made to frying apparatus 100 of FIG. 1 for detailed information about these similar components or devices.

A container 302, having an open top, is provided for holding foods and cooking oil. A central aperture is provided on the bottom of container 302 for allowing a main shaft 304 to thread therethrough.

A coupling device 306, having a hollow cylindrical lower portion, is provided for coupling main shaft 304 and stirring blades 108 for transferring rotation power. The lower portion of coupling device 306 is fixedly engaged with blades 108. The lower portion of coupling device 306 also has a cross-channel coupling element 306a, or other types of coupling elements, which lockably receives main shaft 304 via pin 122. The upper end of coupling device 306 extends upward to substantially the open top of container 302. In operation, the upper portion of main shaft 304 threads inside the inner opening of the lower portion of coupling device 306. Minimal clearance is desired between main shaft 304 and the cylindrical wall of the lower portion of coupling device 306 for ideal performance.

Figure 14:
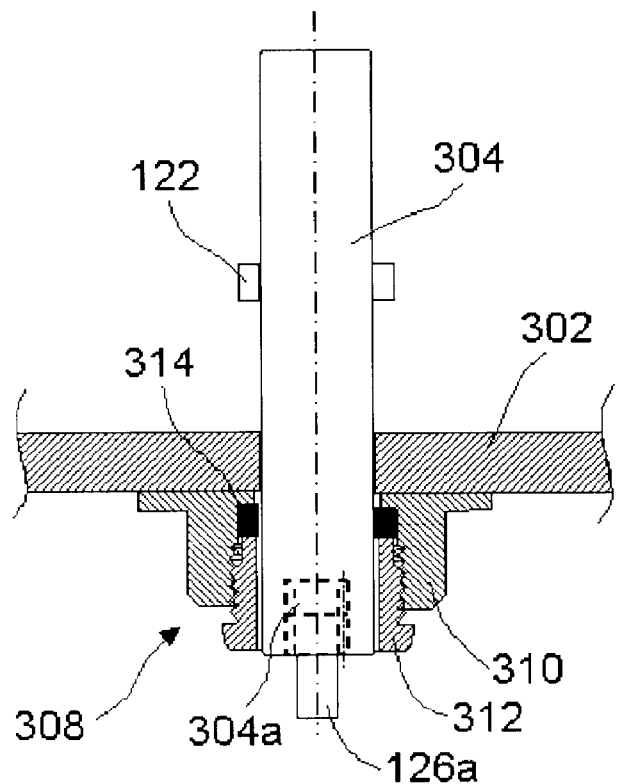
FIG. 14 illustrates an exploded cross-sectional view of seal assembly 308 of FIG. 13.

The lower end of shaft 304 has an inner gear 304a, as more clearly shown in FIG. 14, for removably receiving a motor shaft 126a, which has a square or gear head, such that the lower end of shaft 304 loosely and removably engages with motor shaft 126a. This kind of coupling dramatically reduces the co-axial requirement on main shaft 304 and motor shaft 126a and facilitates the assembly process for manufacturing.

A seal assembly 308 is provided for sealing between shaft 304 and container 302, as shown in FIG. 14, which illustrates an exploded cross-sectional view of seal assembly 308. Seal assembly 308 comprises a seal flange 310, a gland nut 312, and a compression packing 314.

Flange 310 is co-axial to shaft 304. The first end of flange 310 is sealingly installed on the outside surface of the central bottom of container 302. Gland nut 312 is engaged with the second end of flange 310 by means of screw. Packing 314 creates a seal by being squeezed between the throat of the stuffing box formed by flange 310 and gland nut 312. The squeeze force pushes the material against the throat of the box and rotating shaft 304.

When leakage occurs, gland nut 312 is tightened further. This is a typical application of compression packings for low speed rotating shafts, such as shaft 304.

Materials are extremely important when selecting the proper packing for an application. Metallic packings are used in high-temperature applications. Shafts for copper and aluminum packings must be hardened to 500 Brinell hardness number (Bhn). Copper and aluminum packings can handle 538° C. (1000° F.) application temperature.

Seal assembly 308 can, alternatively, take many other forms, such as bushing and labyrinth seals, or combinations of multiple forms for ideal performance, as known to those skilled in the art and suggested by this invention disclosure.

Figure 15:
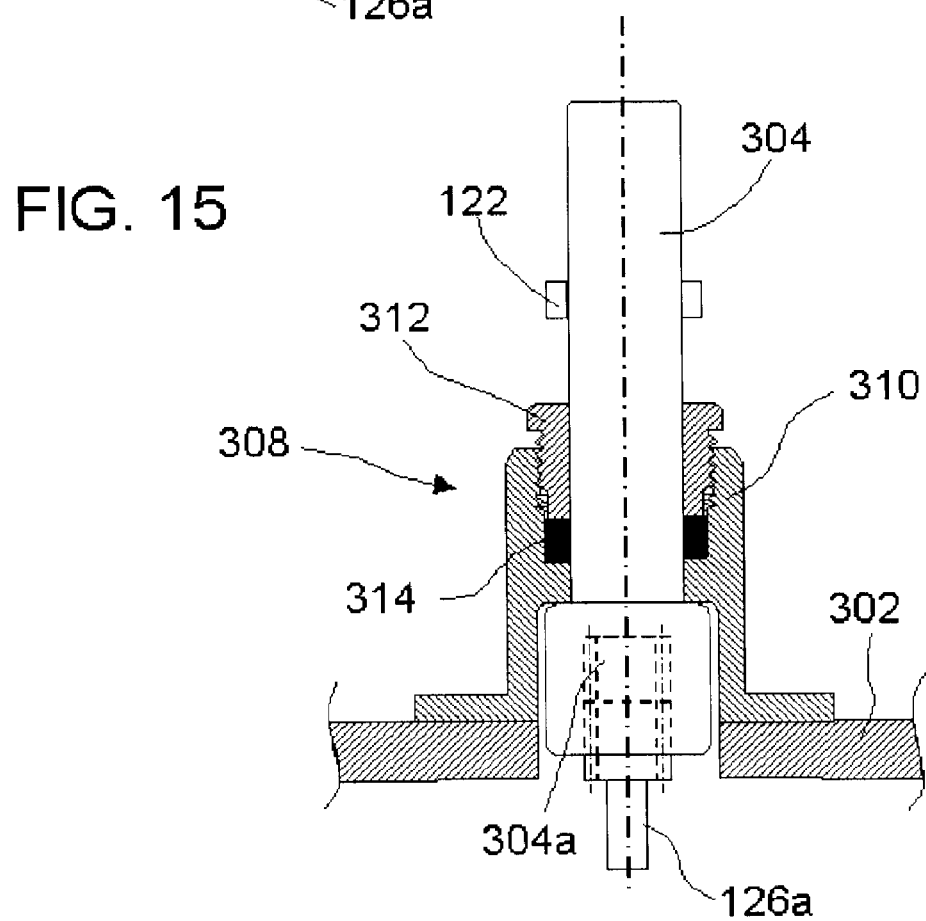
FIG. 15 illustrates an exploded cross-sectional view of an alternative design of seal assembly 308 of FIG. 14.

FIG. 15 illustrates an exploded cross-sectional view of an alternative design of seal assembly 308 of FIG. 14. In this alternative design, seal assembly 308 is installed inside container 302 on the central bottom thereof, instead of being installed outside of container 302. The first end of flange 310 is fixedly installed on the inner surface of the bottom of container 302 and the second end of flange 310 extends upward to a predetermined height above. Gland nut 312 and compression packing 314 are engaged with the second end of flange 310.

There is an important advantage of the alternative design illustrated by FIG. 15. For most applications, seal assembly 308 is higher than the oil level, such that the sealing surface is not immersed in cooking oil or hot liquid. Therefore, the requirement on seal assembly 308 is significantly reduced. In addition, shaft 304 is much better supported at a higher level. In operation, the lower portion of coupling device 306 is routed over seal assembly 308.

Other features of frying apparatus 300 are similar to those of frying apparatus 100.

Figure 16:
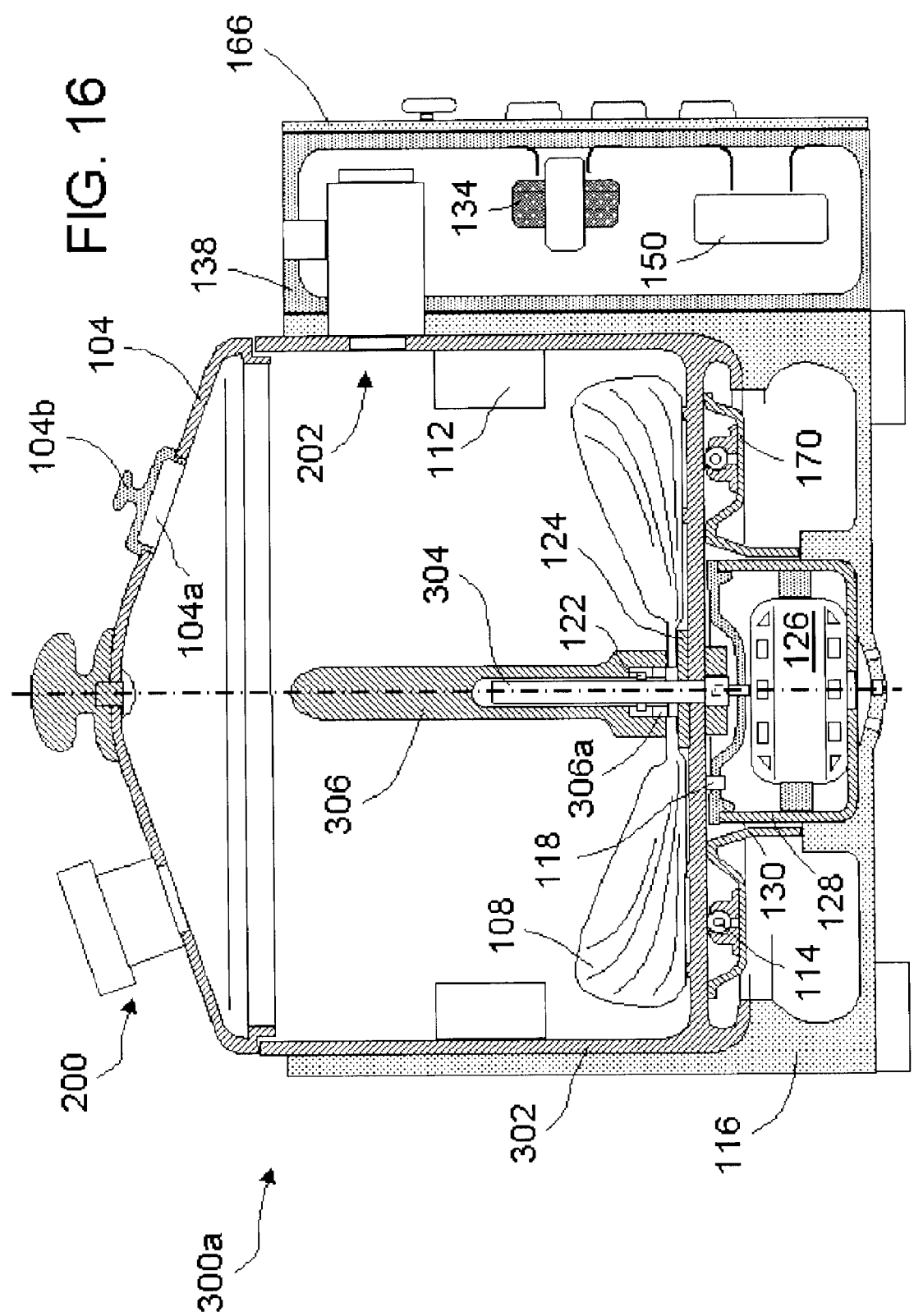

Reference is made to FIG. 16, which illustrates an alternative design of frying apparatus 300 of FIG. 13, a frying apparatus 300a. In this alternative design, a heating element support bracket 170 is provided for supporting heating element 114. Bracket 170 is removably supported by container support 116. Heating element 114 is fixedly installed on bracket 170. Temperature sensor 118 is installed on cap 130 or some other suitable components. Container 302 is removably installed inside container support 116, such that container 302 can be easily taken out for food and used oil handling and for cleaning after use. When container 302 is secured inside the opening of support 116 in an operating position, heating element 114 and sensor 118 are in physical contact with the bottom of container 302.

Other features of frying apparatus 300a are similar to those of frying apparatus 300.

Figure 17:
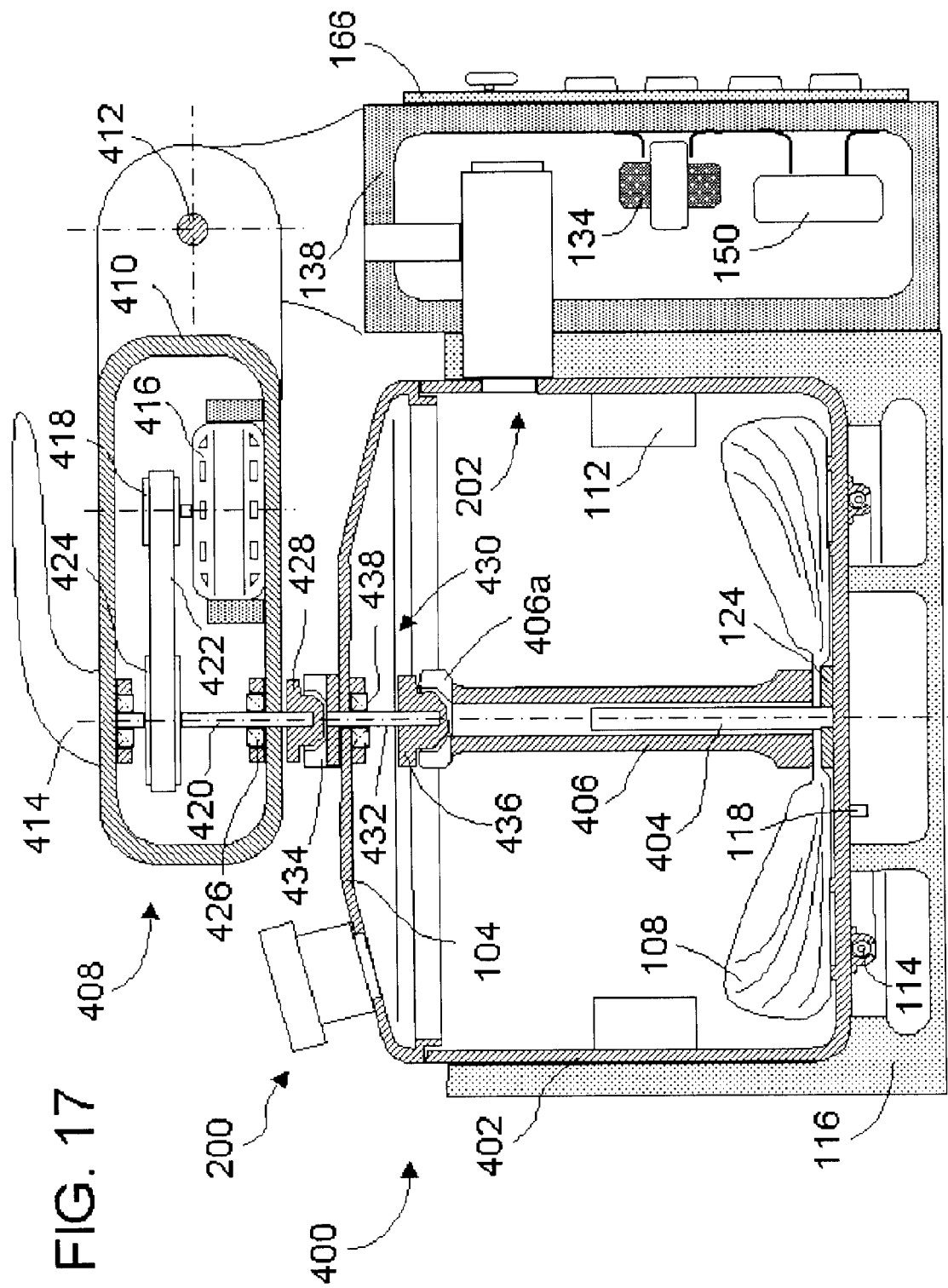
FIG. 17 illustrates a cross-sectional view of a further more embodiment of the present invention, a frying apparatus 400.

Reference is made to FIG. 17, which illustrates a cross-sectional view of a further more embodiment of the present invention, a frying apparatus 400. Some components or devices of frying apparatus 400 are similar to those of frying apparatus 100. Similarity is in the sense of both functionality and configuration. Therefore, similar components or devices are denoted with similar reference numbers for avoiding repetitive explanations. Reference is made to frying apparatus 100 for detailed information about these similar components or devices.

A container 402, having an open top and a closed bottom, is provided for holding foods and cooking oil. A central shaft 404 is provided for guiding a coupling device 406 in position. The lower end of shaft 404 is fixedly installed on the central bottom of container 402 and the upper end thereof extends upward toward the open top of container 402.

Coupling device 406 is provided for operationally transferring rotation power from a power-drive assembly 408 to stirring blades 108. Coupling device 406 has a general configuration of a cylindrical tube forming a central aperture routed over shaft 404. The lower end of coupling device 406 is engaged with blades 108 and the upper end thereof extends upward to substantially the open top of container 402. A coupling element 406a is provided on the upper portion of coupling device 406 for transferring rotation power.

A motor housing 410, disposed above lid 104, is pivotally installed on the upper portion of control housing 138 via a hinge 412. Housing 410 maintains substantially horizontal when secured in an operational position and can be conveniently lifted up via a handle 414.

A drive motor 416 is installed inside housing 410. A motor pulley 418 is fixedly engaged on the motor shaft for transferring rotation power from motor 416 to a main shaft 420 via a belt 422 and a drive pulley 424. Main shaft 420 is installed onto housing 410 via a plurality of bearing elements, generally designated as 426. The lower end of shaft 420 extends downward through the floor of housing 410. A coupling element 428, fixedly engaged on the lower portion of shaft 420 outside housing 410, is provided for driving an intermediate coupling device 430, which is installed on lid 104.

Coupling device 430 includes an intermediate shaft 432, an upper coupling element 434, and a lower coupling element 436.

The upper end of shaft 432 is fixedly engaged with coupling element 434, which is removably coupled with coupling element 428. Coupling element 434 can be specially designed, such that couple element 434 also serves as a lid handle. The lower end of shaft 432 extends downward through a central aperture on lid 104 and is fixedly engaged with coupling element 436, which is removably coupled with coupling element 406a.

Intermediate coupling device 430 is rotatably installed on lid 104 via a bearing element 438.

Other features of frying apparatus 400 are similar to those of frying apparatus 100.

Figure 18:
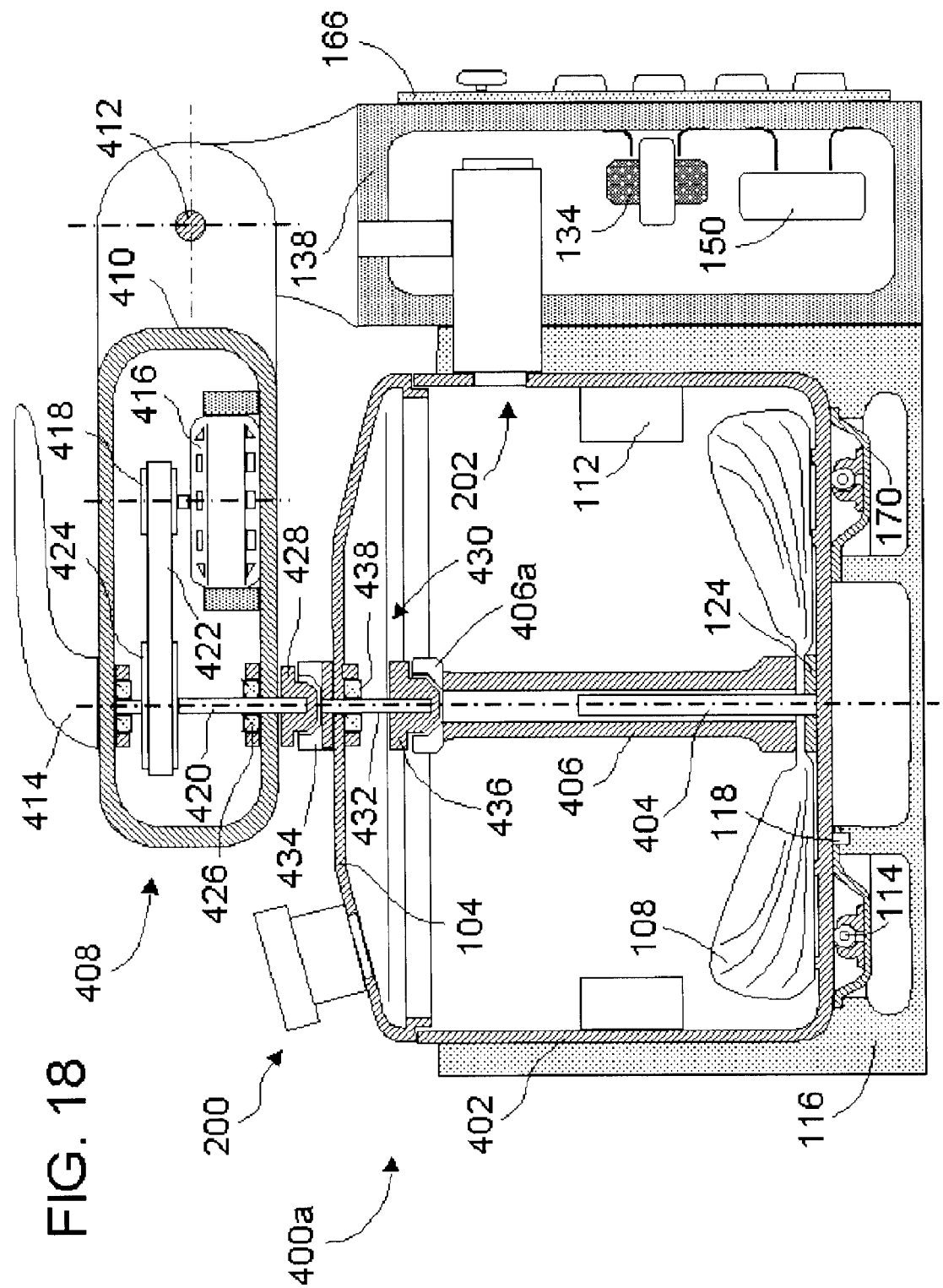

Reference is made to FIG. 18, which illustrates an alternative design of frying apparatus 400 of FIG. 17, a frying apparatus 400a. In this alternative design, a heating element support bracket 170 is provided for supporting heating element 114. Bracket 170 is removably supported by container support 116. Heating element 114 is fixedly installed on bracket 170. Temperature sensor 118 is installed on container support 116, or some other suitable components. Container 402 is removably installed inside container support 116, such that container 402 can be easily taken out for food and used oil handling and for cleaning after use. When container 402 is secured inside the opening of support 116 in an operating position, heating element 114 and sensor 118 are in physical contact with the bottom of container 402.

Other features of frying apparatus 400a are similar to those of frying apparatus 400.

For all the embodiments discussed above, when the container is large, the stirring device is consequently big, such that it may not be quite convenient to use or handle. In order to solve this problem, for the frying apparatus having a large container, the lower portion of the container can be adapted to taper inward, such that the bottom of the container has a smaller diameter. Consequently, the stirring device can be designed smaller.

Accordingly, readers will see that this frying apparatus of the present invention can be used to prepare tasteful fried foods for both deep and shallow frying. The frying process is fully automatic, thereby minimizing human involvement and chore of the frying process. This frying apparatus is used with the lid fully covering on top of the container, thereby eliminating the possibility of grease splattering and the risk of oil burns to people. At the same time, the grease-laden air generated during the frying process is forced out through a venting device and filtered before being discharged into the room, thereby avoiding long-term hazards to the people and home environment.

The stirring blades sweep across food pieces intermittently, such that the blades dwell for a predetermined dwell period starting near the end of each stirring cycle. This intermittent operation favors better agitation of food pieces and affords relief from constant stirring at a higher speed.

The present invention has been described in an illustrative manner. It is to be understood that the terminology, which has been used, is intended to be in the nature of words of description rather than of limitation.

Although this invention has been described in its preferred forms and structures with a certain degree of particularity, these should not be construed as limiting the scope of the invention but as merely providing illustrations of some of the presently preferred embodiments of this invention.

For examples, although this invention has been described in a form of home frying apparatuses, it can have potential business use, such as use in restaurants. Therefore, this invention can alternatively be described as food processing equipment. Although the forced venting system of this invention has been described in a form of blowing fresh air into the frying apparatus, it is understood that rearrangement of the motor, fan, and filters, such that, instead of blowing fresh air into the frying apparatus, the fan actually draws the moisture-laden and grease-laden air out of the frying apparatus, is perfectly inline with the spirit of the forced venting concept of this invention. Such rearrangement is, therefore, covered by the present invention.

Thus it is understood that the present disclosure of the preferred forms can be changed in the details of construction and in the combination and arrangement of parts without departing from the spirit and the scope of the invention as hereinafter claimed.

What is claimed is:

1. A frying apparatus, said frying apparatus comprising:
   a container having an open top for holding foods and oil;
   a lid covering on top of said container for closing up said open top of said container;
   heating means for heating said foods and oil disposed inside said container;
   stirring means installed inside said container for stirring foods;
   a power-drive assembly operationally coupled with said stirring means for driving said stirring means through repeating stirring cycles;
   a blowing device for forcing fresh air into said frying apparatus during frying processes, thereby, facilitating moisture removal from inside said frying apparatus; and
   a venting device for exhausting cooking fumes.

2. A frying apparatus as defined in claim 1, wherein said venting device includes filter means for cooking fume treatment.

3. A frying apparatus as defined in claim 1, wherein said blowing device includes a one-way valve for preventing cooking fumes from escaping therethrough.

4. A frying apparatus as defined in claim 1, said frying apparatus further including control means for automatically de-energizing said power-drive assembly near the end of each stirring cycle for a predetermined dwell period.

5. A frying apparatus as defined in claim 1, said frying apparatus further including control means, said control means dividing the blowing operation of said blowing device into repeating blowing cycles of predetermined length and automatically de-energizing said blowing device near the end of each blowing cycle for a predetermined dwell period.

6. A frying apparatus as defined in claim 1, said frying apparatus further including a housing, wherein said container is removably disposed inside said housing, and whereby it is easier to load and unload foods and to clean said container after use.

7. A frying apparatus as defined in claim 1, wherein said venting device is installed on said lid, and wherein said venting device includes a fabric or paper filter for capturing the grease content in cooking fumes.

8. A frying apparatus as defined in claim 2, wherein said filter means includes a mesh filter for capturing the grease content in cooking fumes, and wherein said mesh filter is washable and reusable.

9. A frying apparatus as defined in claim 8, wherein said filter means includes a fabric or paper filter for capturing the grease content in cooking fumes.

10. A frying apparatus as defined in claim 2, wherein said filter means includes a fabric or paper filter for capturing the grease content in cooking fumes.

11. A frying apparatus as defined in claim 2, wherein said filter means includes a activated carbon filter for capturing the grease content and removing cooking odors in cooking fumes.

12. A frying apparatus, said frying apparatus comprising:
    a container having an open top and an upstanding inner cylindrical wall for holding foods and oil;
    a lid covering on top of said container for closing up said open top of said container;
    heating means for heating said foods and oil disposed inside said container;
    stirring means installed inside said container for stirring foods;
    a power-drive assembly disposed below said container and operationally coupled with said stirring means for driving said stirring means through repeating stirring cycles; and
    a coupling device having an inner cylindrical wall and an outer cylindrical wall, engaged with each other on the upper portion thereof, wherein said outer cylindrical wall of said coupling device is routed over said upstanding inner cylindrical wall of said container and the lower portion of said outer cylindrical wall of said coupling device is engaged with said stirring means, and wherein said inner cylindrical wall of said coupling device includes a coupling element on the lower portion thereof for lockably receiving a drive shaft from said power-drive assembly.

13. A frying apparatus as defined in claim 12, wherein said container includes co-rotation preventing means installed inside said container on the sidewall thereof for preventing food pieces from co-rotating with said stirring means, as said stirring means rotates.

14. A frying apparatus as defined in claim 12, wherein said container includes supporting means installed on the inside bottom thereof for supporting said stirring means, thereby avoiding excessive scraping of said stirring means on the bottom of said container, reducing the friction therebetween, and prolonging the life of said stirring means.

15. A frying apparatus as defined in claim 12, wherein said drive shaft includes supporting means installed on the upper portion thereof for operationally supporting said drive shaft against said upstanding inner cylindrical wall of said container.

16. A frying apparatus as defined in claim 12, said frying apparatus further including control means for automatically de-energizing said power-drive assembly near the end of each stirring cycle for a predetermined dwell period.

17. A frying apparatus as defined in claim 12, said frying apparatus further including a basket having an open top and a central aperture on the bottom thereof removably receiving said upstanding inner cylindrical wall of said container for use to deep-fry foods.

18. A frying apparatus as defined in claim 12, wherein said upstanding inner cylindrical wall of said container extends upwards to a predetermined height above the bottom of said container, and said frying apparatus further including a sealing assembly for sealing between said drive shaft from said power-drive assembly and the upper portion of said upstanding inner cylindrical wall of said container.

19. A frying apparatus as defined in claim 18, wherein said sealing assembly includes a compression-packing adapted to be squeezed against said drive shaft from said power-drive assembly and the upper portion of said upstanding inner cylindrical wall of said container for generating a sealing thereof.

20. A frying apparatus, said frying apparatus comprising:
   a container having an open top and a central aperture on the bottom thereof for holding foods and oil;
   a lid covering on top of said container for closing up said open top of said container;
   heating means for heating said foods and oil disposed inside said container;
   stirring means installed inside said container for stirring foods;
   a power-drive assembly disposed below said container and operationally coupled with said stirring means for driving said stirring means through repeating stirring cycles, said power-drive assembly including a drive shaft threading through said central aperture of said container;
   a sealing assembly installed on the bottom of said container for sealing between the bottom of said container and said drive shaft;
   wherein said sealing assembly includes a compression-packing adapted to be squeezed against said drive shaft from said power-drive assembly and said central aperture on the bottom of said container for generating a sealing thereof; and
   a coupling device engaged with said stirring means and adapted for lockably receiving said drive shaft from said power-drive assembly.

21. A frying apparatus as defined in claim 20, wherein said container includes co-rotation preventing means installed inside said container on the sidewall thereof for preventing food pieces from co-rotating with said stirring means, as said stirring means rotates.

22. A frying apparatus as defined in claim 20, wherein said container includes supporting means installed on the inside bottom thereof for supporting said stirring means, thereby, avoiding excessive scraping of said stirring means on the bottom of said container, reducing the friction therebetween, and prolonging the life of said stirring means.

23. A frying apparatus as defined in claim 20, said frying apparatus further including control means for automatically de-energizing said power-drive assembly near the end of each stirring cycle for a predetermined dwell period, and wherein said control means controls said power-drive assembly to drive said stirring means to perform an intermittent stirring operation across foods.

24. A frying apparatus as defined in claim 20, said frying apparatus further including a basket having an open top and a central aperture on the bottom thereof removably receiving said drive shaft for use to deep-fry foods.

25. A frying apparatus as defined in claim 20, wherein said sealing assembly is installed on the bottom of said container and disposed underneath the bottom of said container.

26. A frying apparatus as defined in claim 20, wherein said sealing assembly is installed on the bottom of said container and disposed inside said container, wherein said compression-packing is disposed at a predetermined height above the bottom of said container, whereby for most applications of said frying apparatus said compression-packing is disposed above boiling oil or hot liquids, and whereby the requirement on said sealing assembly is significantly reduced.

27. A frying apparatus as defined in claim 20, said frying apparatus further including control means for controlling various functions of said frying apparatus, whereby frying processes can be accomplished in a programmed automatic manner for minimizing human involvement and chore in preparing foods.

28. A frying apparatus as defined in claim 20, said frying apparatus further including a venting device for exhausting cooking fumes.

29. A frying apparatus as defined in claim 28, wherein said venting device includes a mesh filter for capturing the grease content in cooking fumes, and wherein said mesh filter is washable and reusable.

30. A frying apparatus as defined in claim 28, wherein said venting device includes a fabric or paper filter for capturing the grease content in cooking fumes.

31. A frying apparatus as defined in claim 28, wherein said venting device includes an activated carbon filter for capturing the grease content and removing cooking odors in cooking fumes.

32. A frying apparatus as defined in claim 20, said frying apparatus further including a blowing device for forcing fresh air into said frying apparatus during frying processes, thereby, facilitating moisture removal from inside said frying apparatus.

33. A frying apparatus as defined in claim 20, said frying apparatus further including a housing, wherein said container is removably disposed inside said housing, and whereby it is easier to load and unload foods and to clean said container after use.

34. A frying apparatus as defined in claim 33, wherein said drive shaft includes a coupling mechanism disposed on the lower portion thereof for lockbly receiving a shaft from said power-drive assembly.

35. A frying apparatus, said frying apparatus comprising:
   a container having an open top, a closed bottom, and an upstanding central shaft installed on the central bottom thereof for holding foods and oil;

a lid covering on top of said container for closing up said open top of said container;

heating means for heating said foods and oil disposed inside said container;

stirring means installed inside said container for stirring foods;

a power-drive assembly disposed above said container and operationally coupled with said stirring means for driving said stirring means through repeating stirring cycles; and a coupling device having a hollow cylindrical lower portion for removably receiving said upstanding central shaft, wherein said hollow cylindrical lower portion of said coupling device is engaged with said stirring means, and wherein said coupling device includes a coupling element on the upper portion thereof for operationally transferring rotation power from said power-drive assembly to stirring means.

36. A frying apparatus as defined in claim 35, wherein said container includes co-rotation preventing means installed inside said container on the sidewall thereof for preventing food pieces from co-rotating with said stirring means, as said stirring means rotates.

37. A frying apparatus as defined in claim 35, wherein said container includes supporting means installed on the inside bottom thereof for supporting said stirring means, thereby, avoiding excessive scraping of said stirring means on the bottom of said container, reducing the friction therebetween, and prolonging the life of said stirring means.

38. A frying apparatus as defined in claim 35, said frying apparatus further including control means for automatically de-energizing said power-drive assembly near the end of each stirring cycle for a predetermined dwell period.

39. A frying apparatus as defined in claim 35, said frying apparatus further including a basket having an open top and a central aperture on the bottom thereof removably receiving said upstanding central shaft for use to deep-fry foods.

* * * * *